(12) United States Patent
Pang et al.

(10) Patent No.: US 8,633,432 B2
(45) Date of Patent: Jan. 21, 2014

(54) REFLECTIVE FOCUSING AND TRANSMISSIVE PROJECTION DEVICE

(75) Inventors: Shuo Pang, Durham, NC (US);
Changhuei Yang, Alhambra, CA (US)

(73) Assignee: California Institute of Technology, Pasadena, CA (US)

( * ) Notice: Subject to any disclaimer, the term of this patent is extended or adjusted under 35 U.S.C. 154(b) by 520 days.

(21) Appl. No.: 12/886,779

(22) Filed: Sep. 21, 2010

(65) Prior Publication Data

US 2011/0226972 A1    Sep. 22, 2011

Related U.S. Application Data

(60) Provisional application No. 61/244,363, filed on Sep. 21, 2009, provisional application No. 61/251,237, filed on Oct. 13, 2009.

(51) Int. Cl.
*H01J 3/14* (2006.01)
*G01J 3/50* (2006.01)
*G01N 15/06* (2006.01)

(52) U.S. Cl.
USPC ............................ 250/216; 250/226; 250/573

(58) Field of Classification Search
USPC .................... 250/208.1, 226, 227.24, 227.25, 250/573–575, 216; 359/368, 372, 373, 377, 359/419, 665, 642, 796; 348/335, 340, 336, 348/272, 273, 294; 257/294, 432–434; 438/65, 57
See application file for complete search history.

(56) References Cited

U.S. PATENT DOCUMENTS 4,896,952 A * 1/1990 Rosenbluth ............... 359/638
4,981,362 A   1/1991 DeJong et al.
5,061,076 A  10/1991 Hurley
(Continued)

FOREIGN PATENT DOCUMENTS

KR  10-2005-0062531   6/2005
WO  WO-0210713 A2    2/2002
(Continued)

OTHER PUBLICATIONS

Popescu, G., et al., "Optical measurement of cell membrane tension," Physical Review Letters 97 (2006).
(Continued)

*Primary Examiner* — Pascal M Bui Pho
(74) *Attorney, Agent, or Firm* — Sheila Martinez-Lemke; Weaver Austin Villeneuve & Sampson LLP

(57) ABSTRACT

Embodiments of the present invention relate to a reflective focusing and transmissive projection device having a body, a set of reflective-focusing components and a light detector. The body has a surface layer with first and second surfaces, and a detecting layer outside the second surface. The set of reflective-focusing components is in the surface layer. Each reflective-focusing component has a contouring element and a curved reflective element conformed to the contouring element. The curved reflective element is configured to reflect light of a first type, transmit light of a second type and focus the light of the first type outside the first surface of the surface layer. The light detector is in the detecting layer, and is configured to receive light and generate light data associated with the received light. Also, the contouring element can be configured to focus the light of the second type on the light detector.

20 Claims, 4 Drawing Sheets

(56) References Cited

U.S. PATENT DOCUMENTS

| | | | |
|---|---|---|---|
| 5,247,167 | A | 9/1993 | Bargerhuff et al. |
| 5,252,834 | A | 10/1993 | Lin |
| 5,362,653 | A | 11/1994 | Carr et al. |
| 5,418,371 | A | 5/1995 | Aslund et al. |
| 5,587,832 | A | 12/1996 | Krause |
| 5,701,008 | A | 12/1997 | Ray et al. |
| 5,795,755 | A | 8/1998 | Lemelson |
| 5,798,262 | A | 8/1998 | Garini et al. |
| 5,936,764 | A | 8/1999 | Kobayashi |
| 5,973,316 | A | 10/1999 | Ebbesen et al. |
| 6,133,986 | A | 10/2000 | Johnson |
| 6,143,247 | A | 11/2000 | Sheppard, Jr. et al. |
| 6,248,988 | B1 | 6/2001 | Krantz |
| 6,499,499 | B2 | 12/2002 | Dantsker et al. |
| 6,636,300 | B2 | 10/2003 | Doemens et al. |
| 7,045,781 | B2 | 5/2006 | Adamec et al. |
| 7,209,287 | B2 | 4/2007 | Lauer |
| 7,250,598 | B2 | 7/2007 | Hollingsworth et al. |
| 7,250,973 | B2 * | 7/2007 | Dobashi et al. ............... 348/340 |
| 7,283,229 | B2 | 10/2007 | Noguchi et al. |
| 7,641,856 | B2 | 1/2010 | Padmanabhan et al. |
| 7,671,987 | B2 | 3/2010 | Padmanabhan et al. |
| 7,738,695 | B2 | 6/2010 | Shorte et al. |
| 7,751,048 | B2 | 7/2010 | Yang et al. |
| 7,768,654 | B2 | 8/2010 | Cui et al. |
| 7,773,227 | B2 | 8/2010 | Yang et al. |
| 7,982,883 | B2 | 7/2011 | Cui et al. |
| 8,039,776 | B2 | 10/2011 | Cui et al. |
| 8,189,204 | B2 | 5/2012 | Cui et al. |
| 8,314,933 | B2 | 11/2012 | Cui et al. |
| 8,325,349 | B2 | 12/2012 | Cui et al. |
| 2003/0063204 | A1* | 4/2003 | Suda ............................. 348/272 |
| 2003/0142291 | A1 | 7/2003 | Padmanabhan et al. |
| 2003/0174992 | A1 | 9/2003 | Levene et al. |
| 2003/0203502 | A1 | 10/2003 | Zenhausern et al. |
| 2004/0175734 | A1 | 9/2004 | Stahler et al. |
| 2004/0224380 | A1 | 11/2004 | Chou et al. |
| 2005/0271548 | A1 | 12/2005 | Yang et al. |
| 2006/0003145 | A1 | 1/2006 | Hansen et al. |
| 2006/0013031 | A1 | 1/2006 | Ravkin et al. |
| 2006/0054502 | A1 | 3/2006 | Peterman et al. |
| 2007/0207061 | A1 | 9/2007 | Yang et al. |
| 2007/0258096 | A1 | 11/2007 | Cui et al. |
| 2007/0277192 | A1 | 11/2007 | Hendriks et al. |
| 2008/0212430 | A1 | 9/2008 | Bakker et al. |
| 2008/0265177 | A1 | 10/2008 | Connally et al. |
| 2009/0101836 | A1 | 4/2009 | Ohtsuka et al. |
| 2009/0179142 | A1 | 7/2009 | Duparre et al. |
| 2009/0225319 | A1 | 9/2009 | Lee et al. |
| 2009/0225411 | A1 | 9/2009 | Cui et al. |
| 2009/0276188 | A1 | 11/2009 | Cui et al. |
| 2010/0195873 | A1 | 8/2010 | Cui et al. |
| 2010/0290049 | A1 | 11/2010 | Yang et al. |
| 2010/0296094 | A1 | 11/2010 | Yang et al. |
| 2010/0309457 | A1 | 12/2010 | Cui et al. |
| 2011/0170105 | A1 | 7/2011 | Cui et al. |
| 2011/0181884 | A1 | 7/2011 | Cui et al. |
| 2012/0061554 | A1 | 3/2012 | Cui et al. |
| 2012/0061587 | A1 | 3/2012 | Wu et al. |

FOREIGN PATENT DOCUMENTS

| | | |
|---|---|---|
| WO | WO-2004038484 A2 | 5/2004 |
| WO | WO 2005/121749 | 12/2005 |
| WO | WO 2008/112416 | 9/2008 |
| WO | WO 2009/111573 | 9/2009 |
| WO | WO 2009/111577 | 9/2009 |
| WO | WO 2011/035299 | 3/2011 |
| WO | WO 2012/033957 | 3/2012 |

OTHER PUBLICATIONS

Psaltis, Demetri, et al., "Developing optofluidic technology through the fusion of microfluidics and optics," Nature, vol. 442 (2006).

Rappaz, B., et al., "Measurement of the integral refractive indeX and dynamic cell morphometry of living cells with digital holographic microscopy," Optics EXpress, vol. 13, pp. 9361-9373 (2005).

Rust, M. J., et al., "Sub-diffraction-limit imaging by stochastic optical reconstruction microscopy (STORM)," Nature Methods, vol. 3, pp. 793-795 (2006).

Sanchez, E.J., et al., "Near-field fluorescence microscopy based on two-photon eXcitation with metal tips," Phys. Rev. Let. 82, 4014 (1999).

Schwiegerling, Jim, and Neal, Daniel, "Historical development of the Shack-Hartmann wavefront sensor," in Robert Shannon and Roland Shack: Legends in Applied Optics, edited by J. E. Harvey and R. B. Hooker_SPIE, Bellingham, WA, pp. 132-139 (2005).

Segre, G., et al., "Behavior of macroscopic rigid spheres in Poiseuille flow: Part 1. Determination of local concentration by statistical analysis of particle passages through crossed light beams," J. Fluid Mech., vol. 14, pp. 115-135 (1962).

Segre, G., et al., "Behavior of macroscopic rigid spheres in Poiseuille flow: Part 2. EXperimental results and interpretation," J. Fluid Mech., vol. 14, pp. 136-157 (1962).

Seo, Jeonggi, et al., "Disposable integrated microfluidics with SELF-aligned planar microlenses," Sensors and Acutators B, vol. 99, pp. 615-622 (2004).

Sommer, R.J, and Sternberg, P.W., "Changes of induction and competence during the evolution of vulva development in nematodes," Science 265, pp. 114-118 (1994).

Spring, Kenneth R., et al., "Introduction to Fluorescence Microscopy," <http://www.microscopyu.com/articles/fluorescence/fluorescenceintro.html> (Aug. 25, 2004).

Stanley, S.L., "Amoebiasis," Lancet 361, pp. 1025-1034 (2003).

Stone, H.A., et al., "Engineering Flows in Small Devices: Microfluidics Toward a Lab-on-a-Chip," Annu. Rev. Fluid Mech., vol. 36, pp. 381-411 (2004).

Tearney, G. J., et al., "Scanning single-mode fiber optic catheter-endoscope for optical coherence tomography," Optics Letters, vol. 21, pp. 543-545 (1996).

Tegenfeldt, Jonas O., et al., "Micro- and nanofluidics for DNA analysis," Analytical and Bioanalytical Chemistry, vol. 378, No. 7, pp. 1678-1692 (2004).

Tegenfeldt, Jonas O., et al., "Near-field Scanner for Moving Molecules," Physical review letters, vol. 86, No. 7, pp. 1378-1381 (Feb. 2001).

Thompson, Russell E., et al., "Precise nanometer localization analysis for individual fluorescent probes," Biophysical Journal, vol. 82, No. 5, pp. 2775-2783 ( May 2002).

Pang, Shuo, et al., "Fluorescence microscopy imaging with a Fresnel zone plate array based optofluidic microscope," Lab on a Chip 11, 3698-3702, (2011).

International Search Report in International Application No. PCT/US2005/016876 mailed on Oct. 16, 2006.

Written Opinion in International Application No. PCT/US2005/016876 mailed on Oct. 16, 2006.

International Search Report in International Application No. No. PCT/US2008/054908 mailed on Aug. 26, 2008.

Written Opinion in International Application No. PCT/US2008/054908 mailed on Aug. 26, 2008.

International Search Report in International Application No. PCT/US2009/036045 mailed on Apr. 23, 2009.

Written Opinion in International Application No. PCT/US2009/036045 mailed on Apr. 23, 2009.

International Search Report in International Application No. PCT/2009/036052 mailed on Jun. 29, 2009.

Written Opinion in International Application No. PCT/2009/036052 mailed on Jun. 29, 2009.

International Search Report and Written Opinion in International Application No. PCT/US2010/052512 mailed on Apr. 18, 2011.

International Search Report and Written Opinion in International Application No. PCT/US2010/049647 mailed on Apr. 29, 2011.

International Search Report and Written Opinion in International Application No. PCT/US2011/050901 mailed on Jul. 2, 2011.

United States Patent and Trademark Office (USPTO) Office Action in U.S. Appl. No. 11/125,718 mailed on Nov. 14, 2008.

United States Patent and Trademark Office (USPTO) Office Action in U.S. Appl. No. 11/125,718 mailed on Jul. 1, 2009.

(56) References Cited

OTHER PUBLICATIONS

United States Patent and Trademark Office (USPTO) Notice of Allowance in U.S. Appl. No. 11/125,718 mailed on Mar. 11, 2010.
United States Patent and Trademark Office (USPTO) Office Action in U.S. Appl. No. 12/797,132 mailed on Oct. 15, 2010.
United States Patent and Trademark Office (USPTO) Notice of Allowance in U.S. Appl. No. 11/686,095 mailed on Feb. 25, 2010.
United States Patent and Trademark Office (USPTO) Office Action in U.S. Appl. No. 11/686,095 mailed on Jan. 10, 2008.
United States Patent and Trademark Office (USPTO) Office Action in U.S. Appl. No. 11/686,095 mailed on Jul. 17, 2008.
United States Patent and Trademark Office (USPTO) Office Action in U.S. Appl. No. 11/686,095 mailed on Feb. 26, 2009.
United States Patent and Trademark Office (USPTO) Office Action in U.S. Appl. No. 11/686,095 mailed on Oct. 28, 2009.
United States Patent and Trademark Office (USPTO) Office Action in U.S. Appl. No. 12/785,635 mailed on Oct. 15, 2010.
United States Patent and Trademark Office (USPTO) Restriction Requirement in U.S. Appl. No. 12/398,050 mailed on Aug. 10, 2011.
United States Patent and Trademark Office (USPTO) Office Action in Patent Application U.S. Appl. No. 12/398,050 mailed on Nov. 14, 2011.
United States Patent and Trademark Office (USPTO) Notice of Allowance in U.S. Appl. No. 12/398,050 mailed on Jul. 17, 2012.
"Lens (optics)," Wikipedia, last modified Aug. 18, 2010.
Adams, Mark L., et al., "Microfluidic Integration on detector arrays for absorption and flourescence micro-spectrometers," Sensors and Actuators A, vol. 104, pp. 25-31 (2003).
Albensi, B. C., et al., "Elements of Scientific Visualization in Basic Neuroscience Research," BioScience, vol. 54, pp. 1127-1137 (2004).
Arnison, M. R., et al., "Linear Phase Imaging Using Differential Interference Contrast Microscopy," Journal of Microscopy, vol. 214, Part. I, pp. 7-12 (Apr. 2004).
Bates et al, "Multicolor super-resolution imaging with photo-switchable fluorescent probes," Science 317, 1749-1753 (2007).
Bethe, H.A., "Theory of Diffraction by Small Holes," The Physical Review, vol. 66, Nos. 7-8, pp. 163-182 (1944).
Betzig, E., et al.,"Imaging intracellular fluorescent proteins at nanometer resolution," Science, vol. 313, pp. 1642-1645 (2006).
Biddiss, Elaine, et al., "Hetergeneous Surface Charge Enhanced Micromixing for Electrokinetic Flows," Anal. Chem., vol. 76, pp. 3208-3213 (2004).
Booth, M. J., et al. , "Adaptive aberration correction in confocal microscope," Proceedings of the National Academy of Sciences of the United States of America, vol. 99, pp. 5788-5792 (Apr. 2002).
Boppart, S. A., et al., "Forward-imaging instruments for optical coherence tomography," Optics Letters, vol. 22, pp. 1618-1620 (1997).
Bouwkamp, C. J., "Diffraction theory," Reports on Progress in Physics XVIII, pp. 35-100 (1954).
Cao, Jinhua, et al., "Brownian Particle Distribution in Tube Flows," Proceedings of IMECE04, vol. 260, pp. 243-252 (2004).
Cogswell, C., et al., "Confocal Differential Contrast Interference (DIC) Microscopy: Including a Theoretical Analysis of Conventional and Confocal DIC Imaging," Journal of Microcscopy, vol. 165, Pt. 1, pp. 81-101 (Jan. 1992).
Courjon, Daniel, "Near-field Microscopy and near-field optics," Imperial College Press, 317 pages (2003).
Creath, K., "Phase-measurement interferometry techniques," Prog. Opt., vol. 26, p. 44 (1988).
Cui, Xiquan, et al., "Lensless high-resolution on-chip optofluidic microscopes for Caenorhabditis elegans and cell imaging," Proceedings of the National Academy of Sciences of the Unities States of America, vol. 105, pp. 10670-10675 (2008).
Cui, Xiquan, et al., "Portable optical microscope-on-a-chip," Proc. SPIE, vol. 6095, pp. 609509-1-609509-8 (Jan. 2006).
Dahan, M., et al., "Time-gated biological imaging by use of colldal quantum dots," Optics Letters, vol. 26, No. 11, pp. 825-827 (2001).
De Fornel, F., "Evanescent waves from Newtonian optics and Atomic optics," Springer, 270 pages (2001).

Doyle, P. S., et al., "Self-assembled magnetic matrices for DNA separation chips," Science, vol. 295, No. 5563, p. 2237 (Mar. 2002).
Dunn, et al., "Introduction to Confocal Microscopy," available from MicroscopyU at http://www.microscopyu.com/articles/confocal (2007).
Ebbesen, T. W., et al., "EXtraordinary optical transmission through sub-wavelength hole arrays," Nature, vol. 391, No. 6668, pp. 667-669 (Feb. 1998).
Fowles, G. R., Introduction to Modern Optics, Dover Publications, Second Ed., pp. 57-61 (1989).
Fu, Anne Y., et al., "A microfabricated fluorescence-activated cell sorter," Nature Biotechnology, vol. 17, No. 11, pp. 1109-1111 (Nov. 1999).
Garcia De Abajo, F. J.,"Light transmission through a single cylindrical hole in a metallic film," Optics Letters, vol. 10, No. 25, pp. 1475-1484 (2002).
Haglund, M. M., et al., "Enhanced optical imaging of human gliomas and tumor margins," Neurosurgery, vol. 38, pp. 308-317 (1996).
Heng, Xin, et al., "An Optical Tweezer Actuated, Nanoaperture-grid based Optofluidic Microscope Implimentation Method," Optics EXpress, vol. 15, No. 25, 16367-75 (2007).
Heng, Xin, et al., "Optofluidic Microscopy," Proceedings of the ICMM 2005 3rd International Conference on Microchannels and Minichannels, pp. 1-6 (2005).
Heng, Xin, et al., "Optofluidic Microscopy—a method for implementing a high resolution optical microscope on a chip," Lab Chip, vol. 6, pp. 1274-1276 (2006).
Cui et al., "Portable Optical microscope-on-a-chip," Photonics West, San Jose, CA Jan. 2006.
Heng, Xin, et al., "Characterization of light collection through a subwavelength aperture from a point source," Optics EXpress, vol. 14, pp. 10410-10425 (2006).
Heng, Xin, et al., "Optofluidic Microscope, a miniature microscope on a chip," 9th International Conference on Miniaturized Systems for Chemistry and Life Sciences (µTAS) (2005).
Hoffman, R., and Gross, L., "The modulation contrast microscope," Nature, vol. 254, (1975), pp. 1169-1176.
Hogenboom, C. A., et al., "Three-dimensional images generated by quadrature interferometry," Optics Letters, vol. 23, pp. 783-785 (1998).
Ikeda, T., et al., "Hilbert phase microscopy for investigating fast dynamics in transparent systems," Optics Letters, vol. 30, pp. 1165-1167 (2005).
Lamb, Don C., et al., Sensitivity Enhancement in Fluorescence Correlation Spectroscopy of Multiple Species Using Time-Gated Detection, Biophysical Journal, vol. 79, pp. 1129-1138 (Aug. 2000).
Lay, Christophe, et al., "Enhanced microfiltration devices configured with hydrodynamic trapping and a rain drop bypass filtering architecture for microbial cells detection," Lab Chip 2008, 8:830-833; published as Advanced Article on Apr. 1, 2008 at http://pubs.rsc.org | DOI:10.1039/b800015h.
Lee, Lap Man, et al., "The Application of On-Chip Optofluidic Microscopy for Imaging Giardia lamblia Trophpzoites and Cysts," Biomed Microdevices, Springer DOI 10.1007/s10544-009-9312-X (2009).
Lew, Matthew et al., "Interference of a four-hole aperture for on-chip quantitative two-dimensional differential phase imaging," Optic Letters, vol. 32, No. 20, pp. 2963-2965 (Oct. 2007).
Lezec, H.J., and Thio, T., "Diffracted evanescent wave model for enhanced and suppressed optical transmission through subwavelength hole arrays," Optics EXpress, vol. 12, No. 16, pp. 3629-3651 (Aug. 2004).
Liu, Shaorong R., "A microfabricated hybrid device for DNA sequencing," Electrophoresis 2003, vol. 24, No. 21, pp. 3755-3761 (2003).
Merenda, F., et al., "Miniaturized high-NA focusing-mirror multiple optical tweezers," Opt. EXp. 15, 6075-6086 (2007).
Murphy, et al., "Differential Interference Contrast (DIC)," available from Nikon MicrocopyU at http://www.microscopyu.com/articles/dic/dicindeX.html (2007).
Nott, Prabhu R., et al., "Pressure-driven flow of suspensions: simulation and theory," 1994, J. Fluid Mech., vol. 275, pp. 157-199.

(56) References Cited

OTHER PUBLICATIONS

Nozokido, Tatsuo, et al., "Scanning Near-Field Millimeter-Wave Microscopy Using a Metal Slit as a Scanning Probe," IEEE Transactions on Microwave Theory and Techniques, vol. 49, No. 3, 491-99 (2001).
United States Patent and Trademark Office (USPTO) Office Action in U.S. Appl. No. 12/638,518 mailed on Jan. 12, 2012.
United States Patent and Trademark Office (USPTO) Notice of Allowance in U.S. Appl. No. 12/638,518 mailed on Feb. 14, 2012.
United States Patent and Trademark Office (USPTO) Notice of Allowance in U.S. Appl. No. 12/638,518 mailed on Apr. 23, 2012.
United States Patent and Trademark Office (USPTO) Office Action in U.S. Appl. No. 12/398,098 mailed on May 25, 2011.
United States Patent and Trademark Office (USPTO) Restriction Requirement in U.S. Appl. No. 12/399,823 mailed on Aug. 10, 2011.
United States Patent and Trademark Office (USPTO) Non-Final Office Action in U.S. Appl. No. 12/399,823 mailed on Nov. 14, 2011.
United States Patent and Trademark Office (USPTO) Final Office Action in U.S. Appl. No. 12/399,823 mailed on May 25, 2012.
United States Patent and Trademark Office (USPTO) Notice of Allowance in U.S. Appl. No. 12/398,050 dated on Aug. 28, 2012.
United States Patent and Trademark Office (USPTO) Notice of Allowance in U.S. Appl. No. 12/638,518 dated on Aug. 24, 2012.
United States Patent and Trademark Office (USPTO) Office Action in U.S. Appl. No. 13/228,448 dated on Nov. 30, 2012.
United States Patent and Trademark Office (USPTO) Allowed Claims in U.S. Appl. No. 13/228,448 dated on Mar. 18, 2013.
United States Patent and Trademark Office (USPTO) Notice of Allowance in U.S. Appl. No. 13/228,448 dated on Mar. 18, 2013.
United States Patent and Trademark Office (USPTO) Notice of Allowance in U.S. Appl. No. 13/228,448 dated on Jul. 11, 2013.
PCT International Preliminary Report on Patentability and Written Opinion dated Sep. 16, 2010 issued in PCT/US2009/036045.
European Search Report dated Feb. 11, 2013 issued in EP 09 716 850.4.
PCT International Preliminary Report on Patentability and Written Opinion dated Mar. 21, 2013 issued in PCT/US2011/050901.
PCT International Preliminary Report on Patentability and Written Opinion dated Apr. 5, 2012 issued in PCT/US2010/049647.
Talbot Effect, Wikipedia, last modified Dec. 27, 2011, 3 pages.
Confocal Microscopy, Wikipedia, last modified Aug. 25, 2010, 3 pages.
Confocal Raman Microscopy (Oct. 2006) "Optofluidic Microscope Enables Lensless Imaging of Microorganisms," *Biophotonics International*, 13(10):24.
Types of confocal microscopy, downloaded from the Internet at http://www.mikriskipie.org/2008/01/26/types-of-confocal-microscopy/14/ on Sep. 10, 2010.
Beam Steering Using Liquid Crystals, Boulder Nonlinear Systems, downloaded from the Internet at http://www.bnonlinear.com/papers/LCBeamSteering.pdf, May 8, 2001, 4 pages.
Beebe, David J., et al., "Physics and Applications of Microfluidics in Biology," *Annu. Rev. Biomed.*, Eng., vol. 4, pp. 261-286 (2002).
Bourzac, (Jul. 30, 2008) "Tiny $10 Microscope, A high-resolution, lens-free microscope fits on a dime-size chip," *Technology Review*, 2 pp.
Brockie et al., (Mar. 1, 2001) " Differential Expression of Glutamate Receptor Subunits in the Nervous System of *Caenorhabditis elegans* and Their Regulation by the Homeodomain Protein UNC-42," *The Journal of Neuroscience*, 21(5):1510-1522.
Buley (Feb. 6, 2009) The $10 Microscope, by Taylor, 2009 Forbes.com, LLC., 2 pp.
Bullock, (Oct. 13, 2008) "Microscope-On-a-Chip Is One Step Closer to the Tricorder," *Wired*, 8 pp.
Cai et al., (Mar. 24, 2004) "Insulinoma-Associated Protein IA-2, a Vesicle Transmembrane Protein, Genetically Interacts with UNC-31/CAPS and Affects Neurosecretion in *Caenorhabditis elegans*," *The Journal of Neuroscience*, 24(12):3115-3124.
Tindol, (Sep. 5, 2006) "Caltech Researchers Announce Invention of the Optofluidic Microscope," *Caltech Media Relations*, 2 pp.
Cheng, Ya, et al., "Microfluidic laser embedded in glass by three-dimensional femtosecond laser microprocessing," *Optics Letters*, vol. 29, No. 17, pp. 2007-2009 (2004).
Chovin, Arnaud, et al., "Fabrication, Characterization, and Far-Field Optical Properties of an Ordered Array of Nanoapertures," *Nano Letters*, vol. 4, No. 10, pp. 1965-68 (2004).
Collet et al., (Jan. 1998) "Analysis of *osm-6* That Affects Sensory Cilium Structure and Sensory Neuron Function in *Caenorhabditis elegans*," *Genetics*, 148:187-200.
Conchello, Jose-Angel, and Lichtman, Jeff W., "Optical sectioning microscopy," *Nature Methods*, vol. 2, No. 12, pp. 920-931 (Dec. 2005).
Coskun, A.F., et al., "Wide-field lensless fluorescent microscopy using a tapered fiber-optic faceplate on a chip," *Analyst*, pp. 3512-3518 (Sep. 7, 2011).
Cubeddu et al., "Time-gated fluorescence spectroscopy and imaging of porphyrins and phthalocyanines," 1991, *SPIE Proceedings*, vol. 1525, pp. 17-25.
Cui, Xiquan, et al., "Quantitative differential interference contrast microscopy based on structured-aperture interference," *Applied Physics Letters*, 93:091113-1-091113-3 (2008).
Cui, Xiquan, et al., "Slanted hole array beam profiler (SHArP)—a high-resolution portable beam profiler based on a linear aperture array," *Optics Letters*, 31(21):3161-3163 (2006).
Erickson et al., (Feb. 2008) "OPTOFLUIDICS: Emerges from the Laboratory," *Photonics Spectra*, pp. 74-79.
Fountain, (Jul. 29, 2008) "Bringing Microscopes Down to Size in Quest for More Compact Labs," *New York Times*, 1 page.
Furtado et al., (2002) "Measurement of green fluorescent protein concentration in single cells by image analysis," *Analytical Biochemistry*, 310:84-92.
Garcia-Sucerquia, J. et al., (2006) "Immersion digital in-line holographic microscopy," *Optics Letters*, 31:1211-1213.
Giloh et al., "Fluorescence microscopy: reduced photobleaching of rhodamine and fluorescein protein conjugates by n-Propyl Gallate," *Science* 217, pp. 1252-1255 (1982).
Han, (2013) "Wide-Field-of-View On-Chip Talbot Fluorescence Microscopy for Longitudinal Cell Culture Monitoring from within the Incubator," *Analytical Chemistry* 85(4):2356-2360.
Hayden, (Jun. 4, 2009) "Microscopic marvels: Microscope for the masses," *Nature* 459(7247):632-633.
Hedgecock et al., (1985) "Axonal Guidance Mutants of *Caenorhabditis elegans* Identified by Filling Sensory Neurons with Fluorescein Dyes," *Developmental Biology*, 111:158-170.
Heng, Xin, "OptoFuidic Microscopy (OFM)" *Biophotonics Group, Caltech, DARPA optofluidic center retreat*, Apr. 1, 2005, 9pp.
"High Refractive Index/Low Refractive Index Resins", NTT AT, downloaded from the Internet at http://www.ntt-at.com/product/hl_resins/ [retrieved on Jun. 12, 2013], 3pp.
Hogan, (Feb. 2008) "Gaining High Resolution with Nanoaperture Grid," *Photonics Spectra*, p. 103.
Hogan, (Jul. 2008) "Getting in Deeper," *Biophotonics*, p. 25 (5 pages).
Jaiswal, Jyoti K., et al., "Long-term multiple color imaging of live cells using quantum dot biconjugates," Nature Biotechnology, vol. 21, pp. 47-51 (2003).
Lange et al., (2005) "A microfluidic shadow imaging system for the study of the nematode *Caenorhabditis elegans* in space," *Sensors and Actuators B*, 107:904-914.
Leonard (Oct. 2008) "Microscope-on-a-Chip Is Small in Size, Big in Scope," *Medical Manufacturing News, NEED TO KNOW*, 1 page.
Lezec, H.J., et al. "Beaming Light from a Subwavelength Aperture," *Science* vol. 297, No. 5582, pp. 820-822 (2002).
Li et al., (1997) "Transport, Manipulation, and Reaction of Biological Cells On-Chip Using Electrokinetic Effects," *Anal. Chem*, 69:1564-1568.
Liang, J. Z., et al., "Supernormal vision and high-resolution retinal imaging through adaptive optics," *Journal of the Optical Society of America*, 14(11):2884-2892 (Nov. 1997).
Lichtman et al., "Fluorescence microscopy," *Nat. Methods* 2(12) (2005).
Liu and Yang (Aug. 16, 2012) "Themed issue: Optofluidics," *Editorial, Lab on a Chip* 12(19): 3539-3539.

(56) References Cited

OTHER PUBLICATIONS

Liu and Yang (May 30, 2013) "Optofluidics 2013," *Editorial, Lab on a Chip Advance Article*, Downloaded on Nov. 6, 2013, RSC Publishing, 2 pages.

Madrigal, (Jul. 28, 2008) "Mini-Microscope Could Lead to Cell-Sorting Implants," downloaded from http:www.wired.com/wiredscience/2008/07/mini-microscope, 3 pp.

Messerschmidt (Sep. 2007) "Gradient Index Optical Microsystems Visualize Living Cells in Deep Tissue," *Grintech GmbH. Biophotonics International*, pp. 36-38.

Minkel, (Jul. 29, 2008) "Lensless On-Chip Microscope Inspired by "Floaters" in the Eye," *Scientific American*, 3 pp.

Montgomery, W.D., "Self-Imaging Objects of Infinite Aperture," *J. Opt. Soc. Am.*, vol. 57, pp. 772-775 (1967).

Moon, SangJun, et al., "Integrating Microfluidics and Lensless Imaging for point-ofcare testing," *Biosensors and Bioelectronics*, vol. 24, Issue 11, pp. 3208-3214 (Jul. 15, 2009).

Ottevaere et al., (2006) "Comparing glass and plastic refractive microlenses fabricated with different technologies," *Journal of Optics a-Pure and Applied Optics*, 8(7):5407-5429.

Pang, Sean, et al., "Implementation of a color-capable optofluidic microscope on a RGB CMOS color sensor chip substrate," *Lab on a Chip*, vol. 10, pp. 411-414 (2010).

Pang et al., (Dec. 1, 2012) "Wide and Scalable Field-of View Talbot-Grid-Based Fluorescence Microscopy," *Optic Letters* 37(23):5018-5020.

Patorski, "The self-imaging phenomenon and its applications," *Progress in Opt.* 27, pp. 3-108 (1989).

Perkins et al., (1986) "Mutant Sensory Cilia in the Nematode *Caenorhabditis elegans*," *Developmental Biology*, 117:456-487.

Resolution- "Airy Patterns and Resolution Criteria (3-D Version)," Olympus Fluo View Resource Center—Interactive Java Tutorials, downloaded from the Internet at http://www.olympusconfocal.com/java/resolution3d [retrieved on Jun. 12, 2013], 3pp.

Richard et al., (2009) "An integrated hybrid interference and absorption filter for fluorescence detection in lab-on-a-chip devices," *Lab on a Chip*, 9:1371:1376.

Ririe et al., (Dec. 23, 2008) "The *Caenorhabditis elegans* vulva: A post-embryonic gene regulatory network controlling organogenesis," *Proceedings of the National Academy of Sciences of the United States of America*, 105(51):20095-20099.

Seo, et al., (2009) "Lensfree holographic imaging for on-chip cytometry and diagnostics," *Lab on a Chip*, 9:777-787.

Slavich-"Technical specifications of holography materials," downloaded from the Internet at http://www.slavich.com/holo_summary [retrieved on Jun. 12, 2013], 2pp.

Svitil, (Jul. 28, 2008) "Microscope on a Chip," *Caltech Bioengineers Develop, Caltech Media Relations*, downloaded from http://www.caltech.edu/content/caltech-bioengineers-develop-microscope-chip, 2pp.

Tai, Y. C., et al., "Integrated micro/nano fluidics for mass-spectrometry protein analysis," *International Journal of Nonlinear Sciences and Numerical Simulation*, 3(3-4):739-741 (2002).

Tam et al., (May 24, 2004) "An imaging fiber-based optical tweezer array for microparticle array assembly," *Appl. Phys. Lett.*, 84(21):4289-4291.

Thorsen, Todd, et al., "Microfluidic Large-Scale Integration," *Science*, vol. 298, pp. 580-584 (2002).

Tokeshi, Manabu, et al., "Chemical processing on microchips for analysis, synthesis, and bioassay," *Electrophoresis*, vol. 24, No. 21, pp. 3583-3594 (2003).

Trau, D., et al., "Genotyping on a complementary metal oxide semiconductor silicon polymerase chain reaction chip with integrated DNA microarray," Analytical Chemistry, 74(13):3168-3173 (2002).

Tsien, Roger, et al., (1998) "The green fluorescent protein," *Annual Review of Biochemistry*, 67:509-544.

Tsien, Roger, et al., "Fluorophores for Confocal Microscopy: Photophysics and Photochemistry," *Handbook of Biological Confocal Microscopy*, third edition, Springer Science + Business Media, pp. 38-352 (2006).

Walker, Glenn, and Beebe, David, "A Passive Pumping Method for Microfluidic Devices," *Lab on Chip*, pp. 131-134 (2002).

Wang et al., "Characterization of acceptance angles of small circular apertures," *Optics Express* 17 (26), 23903-23913, 2009.

Wang et al. (Jun. 26, 2012) "Deep-tissue focal fluorescence imaging with digitally time-reversed ultrasound-encoded light," *Nature Communications* 3(928):8 pages.

Woo (Spring 2009) "A Toymaker's Lab," *Engineering & Science*, pp. 22-27.

Wu, J., Cui, X., Lee, L. M., and Yang, C., "The application of Fresnel zone plate based projection in optofluidic microscopy," *Opt. Exp.* 16, 15595 (2008).

Xu, W., Jericho, M., Meinertzhagen, I., Kreuzer, H., "Digital in-line holography for biological applications," *PNAS USA*, vol. 98, pp. 11301-11305 (2001).

Yang, et al. (Jul. 2006) "Optofluidics can create small, sheap biophotonic devices," *Laser Focus World*, 42(6):85-88.

Yang, et al. (Dec. 2006) "Optofluidics Reinvents the Microscope," *Laser Focus World*, 42(12):83-86.

Yang et al. (Spring 2007) "Building a Microscopic Microscope," *ENGenious—Progress Report*, Spring 2007, pp. 44-47.

Yang et al. (2008) "New Micro-Microscope is Portable and Cheap," *National Public Radio, Interview: Talk of the Nation*, 11 pp.

Yang et al. "OPTOFLUIDICS: Optofluidics Enhances Cytometry," *BioOptics World* downloaded on Aug. 5, 2013 from http://bioopticsworld.com/articles/print/volume-2/issued-1/features/feature-focus/optofl . . . , 6pp.

Yanowitz, et al., (2005) "Cyclin D involvement demarcates a late transition in *C. elegans* embryogenesis," *Developmental Biology*, 279:244-251.

Zhu, Liang, et al., "Filter-based microfluidic device as a platform for immunofluorescent assay of microbial cells," *Lab Chip*, 2004, vol. 4, pp. 337-341; published as Advanced Article on Apr. 5, 2004 at http://pubs.rsc.org | DOI: 10.1039/b401834f.

Goodman et al. (2005) "Holography," Chapter 9: pp. 297-393, *Introduction to Fourier Optics*, $3^{rd}$ Edition, Roberts & Company Publishers.

Probstein, R.F., (2003) "Solutions of Uncharged Macromolecules and Particles," Chapter 5: pp. 109-116, p. 123; "Solutions of Electrolytes," Chapter 6: pp. 190-197; "Surface Tension," Chapter 10: pp. 309-310; *Physicochemical Hydrodynamics*, Wiley, $2^{nd}$ Edition.

\* cited by examiner

REFLECTIVE FOCUSING AND TRANSMISSIVE PROJECTION DEVICE

CROSS-REFERENCES TO RELATED APPLICATIONS

This is a non-provisional application of and claims priority to U.S. Provisional Patent Application No. 61/244,363 entitled "Reflective Focusing and Transmissive Projection Device" filed on Sep. 21, 2009 and to U.S. Provisional Patent Application No. 61/251,237 entitled "Approaches for Building Compact Fluorescence Microscopes" filed on Oct. 13, 2009. These provisional applications are hereby incorporated by reference in their entirety for all purposes.

This non-provisional application is related to the following co-pending and commonly-assigned patent applications, which are hereby incorporated by reference in their entirety for all purposes:

U.S. patent application Ser. No. 12/398,050 entitled "Optofluidic Microscope Device with Photosensor Array" filed on Mar. 4, 2009.

U.S. patent application Ser. No. 12/399,823 entitled "Scanning Illumination Microscope" filed on Mar. 6, 2009.

BACKGROUND OF THE INVENTION

Embodiments of the present invention generally relate to reflective focusing and transmissive projection devices. More specifically, certain embodiments relate to reflective focusing and transmissive projection devices used in imaging and sensing applications such as microscopy or photography.

Microscopes and other optical microscopy devices are used extensively in modern biomedicine and bioscience. Typically, conventional microscopes include an objective lens, a platform for supporting a specimen, and an eyepiece containing lenses for focusing images. These conventional microscope designs have bulky optics, and have proven to be expensive and difficult to miniaturize. Further, since high resolution objective lenses have a limited field of view, the specimen stage must be moved to increase the scope of the view, which can be time-consuming.

A conventional confocal laser scanning microscope uses a laser beam to provide light which is focused by an objective lens into a small focal volume at the specimen. Scattered and reflected laser light as well as any fluorescence light from the illuminated spot on the specimen is collected by the objective lens. The collected light is transmitted to a beam splitter which separates out the light of interest and passes it to a detection apparatus. As the laser scans over a plane of interest, an image can be obtained of the specimen. This technique can be time-consuming since the laser must scan over the specimen to collect sufficient light data for an image. In addition, the separate component of the beam splitter can make the device bulky.

BRIEF SUMMARY OF THE INVENTION

Embodiments of the present invention relate to a reflective focusing and transmissive projection device used in imaging and sensing applications such as microscopy or photography.

One embodiment is directed to a reflective focusing and transmissive projection device comprising a body, a set of reflective-focusing components and a light detector. The body has a surface layer with first and second surfaces, and a detecting layer outside the second surface of the surface layer. The set of reflective-focusing components is in the surface layer. Each reflective-focusing component has a contouring element and a curved reflective element conformed to the contouring element. The curved reflective element is configured to reflect light of a first type and transmit light of a second type. The curved reflective element is further configured to focus the light of the first type to outside the first surface of the surface layer. The light detector is in the detecting layer, and is configured to receive light and generate light data associated with the received light. In some cases, the contouring element is configured to focus the light of the second type on the light detector.

Another embodiment is directed to a reflective focusing and transmissive projection system comprising a reflective focusing and transmissive projection device and a processor in electronic communication with the light detector. The reflective focusing and transmissive projection device includes a body, a set of reflective-focusing components and a light detector. The body has a surface layer with first and second surfaces, and a detecting layer outside the second surface of the surface layer. The set of reflective-focusing components is in the surface layer. Each reflective-focusing component has a contouring element and a curved reflective element conformed to the contouring element. The curved reflective element is configured to reflect light of a first type and transmit light of a second type. The curved reflective element is also configured to focus the light of the first type to outside the first surface of the surface layer. The light detector is in the detecting layer, and is configured to receive light and generate light data associated with the received light. The processor is processor configured to receive the light data from the light detector and analyze the light data.

Another embodiment is directed to a reflective focusing and transmissive projection device comprising a body, a one-dimensional array of reflective-focusing components and a light detector. The body defines a fluid channel and comprises a surface layer having a first surface proximal to the fluid channel and a second surface. The body also comprises a detecting layer outside the second surface of the surface layer. The one-dimensional array of reflective-focusing components is located in the surface layer. Each reflective-focusing component has a contouring element and a curved reflective element conformed to the contouring element. The curved reflective element is configured to reflect light of a first type and transmit light of a second type from the fluid channel. The curved reflective element is also configured to focus the light of the first type to the fluid channel, wherein the one-dimensional array of reflective-focusing components extends substantially across from a first lateral side to a second lateral side of the fluid channel. The light detector is in the detecting layer, and is configured to receive light and generate time varying data associated with the received light as a specimen passes through the fluid channel.

DETAILED DESCRIPTION OF THE INVENTION

Figure 1:
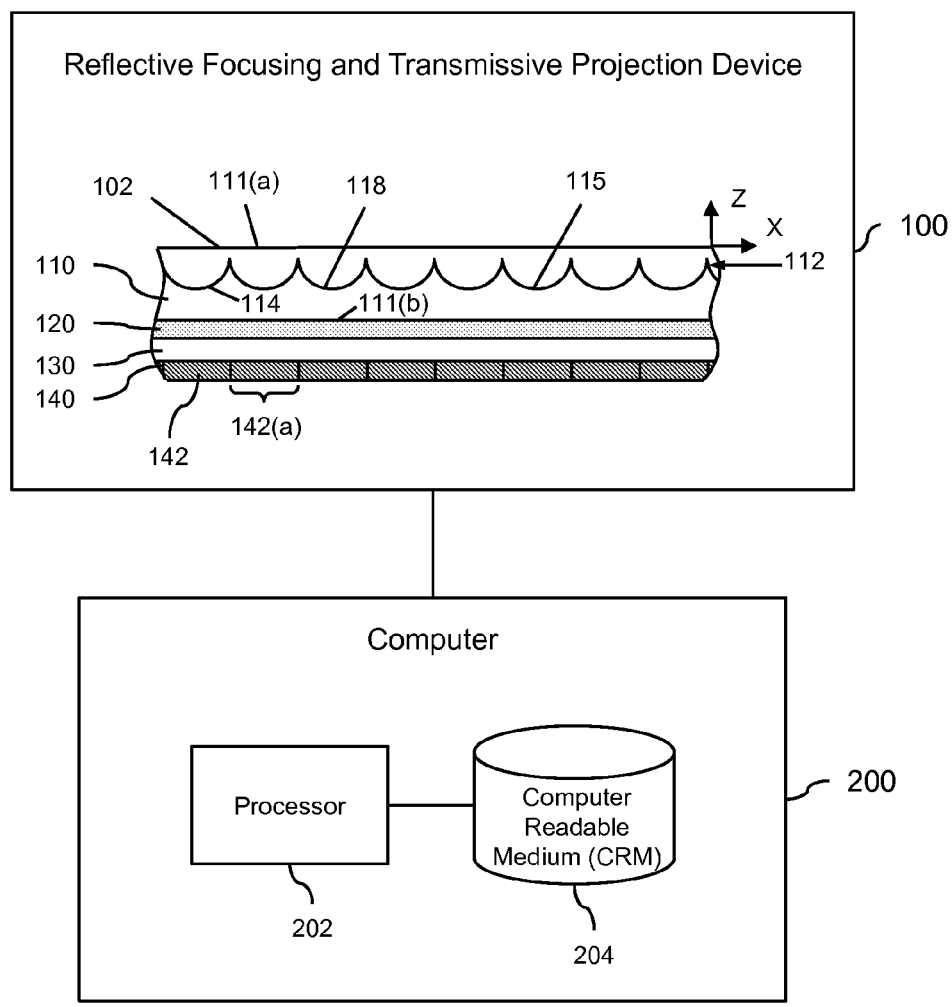
FIG. 1 is a schematic drawing of components of a reflective focusing and transmissive projection system, according to embodiments of the invention.

Embodiments of the present invention will be described below with reference to the accompanying drawings. Embodiments include a reflective focusing and transmissive projection device having a set of reflective-focusing components for reflecting and focusing light of a first type (e.g., excitation light) into a pattern of tightly focused light spots (e.g., point illuminations) on a specimen outside one side of a surface layer. The set of reflective-focusing components also transmits and/or focuses light of a second type (e.g., specimen emissions) onto a light detector outside the other side of the surface layer. The light detector can generate light data based on the received light, which can be used to image or otherwise analyze the specimen.

One embodiment of the reflective focusing and transmissive projection device includes a multi-layer body having a surface layer with first and second surfaces (sides), and a detecting layer outside the second surface. A specimen is located outside the first surface. The surface layer has a set of reflective-focusing components. Each reflective-focusing component having a curved reflective element (e.g., reflective coating/film) on a curved surface of the contouring element (e.g., surface of a lenslet array or curved surface array). The curved reflective elements reflect light of a first type (e.g., excitation light) from an illumination source and focus the reflected light into a first light field pattern of tightly focused light spots (e.g., point illuminations) to a focal plane near the specimen. The curved reflective elements receive and transmit light a second type (e.g., emission light) from the specimen, and the contouring elements focus the light into a second light field pattern at the light detector.

In an exemplary photoluminescence operation, an illumination source provides an excitation light to a reflective focusing and transmissive projection device. The curved reflective elements in the surface layer reflect the excitation light (e.g., single wavelength or polarization) and focus it into a pattern of tightly focused light spots (e.g., point illuminations) on a specimen outside the surface layer. The light spots are scanned (e.g., raster scanned or linearly scanned) over an area larger than the coverage area of the corresponding curved reflective element. In response to the light spots, the specimen emits light of another type (e.g., different wavelength or polarization). The curved reflective elements transmit the emissions and the contouring elements focus the emissions into another light field pattern on the light detector. The light detector generates light data based on the emissions and uses the light data to image or otherwise analyze the specimen. The focusing and transmissive projection device may optionally include a filter located between the surface layer and the light detector. The filter can block any excitation light that may have passed through the surface layer to help ensure that the light received by the light detector is primarily due to emissions from the specimen.

Embodiments of the invention provide one or more technical advantages. One advantage is that the device has few components in a simple multi-layered arrangement. Since the body is a multilayered structure, the device can be fabricated inexpensively using standard semiconductor and micro/nanofabrication procedures. Also, a multilayered structure can be easily miniaturized. Another advantage is the use of curved reflective elements (e.g., lenslet array with reflective coating) to make efficient use of the examining (excitation) light field. Some embodiments include curved reflective elements capable of reflecting over 95% of the examining light field into the light spots. The use of curved reflective elements to perform reflective focusing is particularly useful because it has been demonstrated that reflective focusing can actually provide a higher numerical aperture than if a comparable surface is used as a refractive surface for transmissive focusing as shown in F. Merenda, J. Rohner, J. M. Fournier, and R. P. Salathe, "Miniaturized high-NA focusing-mirror multiple optical tweezers," Optics Express 15, 6075-6086 (2007), which is hereby incorporated by reference in its entirety for all purposes. By using the curved surfaces, the examining light can be efficiently collected and focused into point illuminations on the specimen. This advantage is particularly useful in fluorescent applications to activate fluorophores. Another advantage is an adjustable plane of focus. The device can be designed to place the focal plane of the light spots at a specific height outside the surface layer. In this way, the light spots can be positioned through a specimen being examined. Designing the focus to be at a plane running through the specimen will provide high quality detection and high resolution images. Another advantage is that the reflective focusing and transmissive projection device can simultaneously capture light data over a wide field of view while generating high resolution images. The device can raster scan or linearly scan the light spots over the specimen to project light over a large field of view. In addition, the emissions can be collected and focused into higher intensity light projections which are easier to detect. With higher intensity light data being received by the light detector, the reflective focusing and transmissive projection device can generate high resolution images and/or other high quality detection analyses. Since the reflective focusing and transmissive projection device can simultaneously provide high resolution images and capture light data over a wide field of view, the reflective focusing and transmissive projection device can provide rapid processing of high quality images and other analyses.

Some embodiments of the invention provide specialized advantages when used in fluorescence and phosphorescence applications. In these applications, emission from a specimen can be weak and difficult to detect. An advantage of using the reflective focusing and transmissive projection device is that the reflective-focusing components can efficiently capture emissions from the specimens and focus the emissions to the light detector. Since these reflective-focusing components are located in the surface layer, they can be placed in close proximity to a specimen to efficiently collect the emissions from the specimen. In addition, the emissions can be focused by the reflective-focusing components into focused light projections. Since the focused light projections can be of higher intensity than the emissions from specimen, the emissions will be easier to detect by the light detector, which can improve the quality of the analyses performed and resolution of the images generated.

I. Reflective Focusing and Transmissive Projection System

FIG. 1 is a schematic drawing of components of a reflective focusing and transmissive projection system 10, according to embodiments of the invention. System 10 includes a reflective focusing and transmissive projection device 100 in electronic communication with a computer 200. The computer 200 can process data communicated from the reflective focusing and transmissive projection device 100. The computer 200 includes a processor 202 coupled to a computer readable medium (CRM) 204. In other embodiments, the processor 202 and/or computer readable medium 204 may be a component of the reflective focusing and transmissive projection device 100 or may be integrated into a component of the reflective focusing and transmissive projection device 100. Although not shown, system 10 can also include other suitable devices such as a display (e.g., a monitor) coupled to the processor 202, other processors, other filters, an illumination source, a specimen stage, a scanning device, etc. Although the system 10 is shown to have a single focusing and transmissive projection device 100, other embodiments may have two or more focusing and transmissive projection devices 100.

FIG. 1 includes a cross-sectional view of components of the reflective focusing and transmissive projection device 100 having a body 102 with a first surface 111(a) and second surface 111(b), according to embodiments of the invention. The reflective focusing and transmissive projection device 100 also includes an x-axis and a z-axis that lie in the cross-sectional plane. The z-axis is orthogonal to the second surface 111(b). The x-axis is orthogonal to the z-axis.

A body 102 can be a multi-layer structure or a single, monolithic structure. In the illustrated example, the body 102 is a multi-layer structure including a surface layer 110, a filter layer 120, an intermediate layer 130, and a detecting layer 140 having a light detector 142. Each layer of the body 102 may be made of any suitable material(s) having any suitable thickness, and may include any suitable device(s) (e.g., a light detector). For example, the intermediate layer 130 can be made of an opaque or semi-opaque material (e.g., epoxy). Other embodiments may integrate, omit, add, or change the location of one or more layers in the body 102. For example, some embodiments do not include the filter layer 120 and/or the intermediate layer 130. As another example, an embodiment may locate the filter layer 120 at the first surface of the surface layer 110.

In addition to the first surface 111(a) and the second surface 111(b), the surface layer 110 includes a set of reflective-focusing components 112 having one or more reflective-focusing components 114. A reflective-focusing component 114 refers to any suitable device(s) capable of reflecting and focusing light of a first type outside the first surface 111(a) of the surface layer 110, and transmitting and/or focusing light of a second type outside the second surface 111(b) of the surface layer 110. A set of reflective-focusing components 112 refers to one or more reflective-focusing components 114 that are capable of collectively reflecting and focusing light of a first type into a first light field pattern outside the first surface 111(a) of the surface layer 110, and transmitting and/or focusing light of a second type into a second light field pattern that is passed through the filter layer 120 to the light detector 142 in the light detecting layer 140.

In other embodiments, the surface layer 110 may include additional, alternative or fewer components. For example, the surface layer 110 may have a transparent protective material placed on the set of reflective-focusing components 112.

In many embodiments, a reflective focusing and transmissive projection device 100 with a multi-layered body 102 can be fabricated using standard semiconductor and micro/nano-fabrication procedures. In one example, the detecting layer 140 comprising a light detector 142 (e.g., CMOS sensor) can be coated with the filter layer 120 capable of blocking the light of a first type with good efficiency. The set of reflective-focusing components 112 (e.g., lenslet array with reflective coating (e.g., dichroic filter)) can be placed directly on top of the filter layer 120 to form the surface layer 110.

Light of a first type refers to light having a first light property or set of light properties. Light of a second type refers to light having a second light property or light properties different from the first light property or properties. Any suitable light property or combination of light properties can be used. Some examples of suitable light properties include polarization, wavelength, frequency, intensity, phase, orbital angular momentum, etc. For example, light of the first type may have a wavelength 1 and light of the second type may have a wavelength that is different from wavelength 1. In one embodiment, light of a first type is light having a first wavelength (e.g., 488 nm) and light of a second type is any light of a different wavelength or light of a select second wavelength (e.g., 510 nm) different from the first wavelength. In another embodiment, light of a first type is light having a wavelength of a plurality of wavelengths (e.g., spectral bandwidth between 488 nm to 500 nm) and light of a second type is any light having a different wavelength not belonging to the plurality of wavelengths or light having a particular second wavelength (e.g., 510 nm) that does not belong to the plurality of wavelengths. In yet another embodiment, light of a first type is light having a first polarization and light of a second type is light having different polarization. In exemplary fluorescence or phosphorescence embodiments, light of a first type is an excitation light and light of a second type is an emission light (emissions) from the specimen in response to receiving excitation light. For example, the light of the first type can be fluorescence, 2-photon or higher order fluorescence, Raman, second harmonic or higher order, or other emission mechanism that results in emissions at a different wavelength or other different property than the excitation light.

In operation, the set of reflective-focusing components 112 receives light of the first type (e.g., excitation light). The set of reflective-focusing components 112 reflects and focuses the received light of the first type into a first light field pattern at a focal plane outside the surface 111(a) of the surface layer 110. The set of reflective-focusing components 112 also transmits light of a second type. In some cases, the set of reflective-focusing components 112 also focuses the transmitted light into a second light field pattern at a focal plane outside the second surface 111(b) of the surface layer 110. The filter layer 120 between the detecting layer 140 and the surface layer blocks any light of the first type. The light detector 142 in the light detecting layer 140 detects the second light field pattern and generates light data associated with the detected light. The processor 202 receives the light data from the light detector 142 and analyzes the light data.

A light field pattern refers to an arrangement of light projections. Some examples of suitable arrangements include a one-dimensional array, a two-dimensional array, and a multiplicity of one-dimensional and/or two-dimensional arrays. The arrays can have any suitable orientation or combination of orientations. A first light field pattern refers to a suitable arrangement of light projections of light of the first type reflected and focused by the set of reflective-focusing components 112 to a first focal plane 156 (shown in FIG. 2(a)). A second light field pattern refers to a suitable arrangement of light projections of light of the second type transmitted and focused by the set of reflective-focusing components 112 to a second focal plane 160 (shown in FIG. 2(b)). In some cases, the first light field pattern includes light projections (e.g., light spots) of excitation light that can be used to activate the fluorophores in a specimen located outside the first surface 111(a) of surface layer 110.

The light projections in the first and second light field patterns can have any suitable dimension and light properties (e.g., phase, amplitude, etc.). Some examples of suitable diameters of light projections are 1 micron, 5 microns, 10 microns, 20 microns, etc. In one embodiment, the light projections are light spots. In some cases, the light spots can be tightly focused light spots (e.g., point illuminations) with small diameters (e.g., 1 micron, 2 microns, etc.). In another embodiment, the light projections may be larger than the size of a light detecting element 142(a) of the light detector 142. In some embodiments, the light properties are uniform over the light projections. In other embodiments, the phase and/or amplitude of the light may vary spatially over the light projection.

In FIG. 1, each reflective-focusing component 114 includes a contouring element 118 (e.g., lens or curved surface) and a curved reflective element 115 (e.g., reflective coating) coupled to a curved surface of the contouring element 118. The curved reflective element 115 may be coupled to the using any suitable method.

Figure 2A:
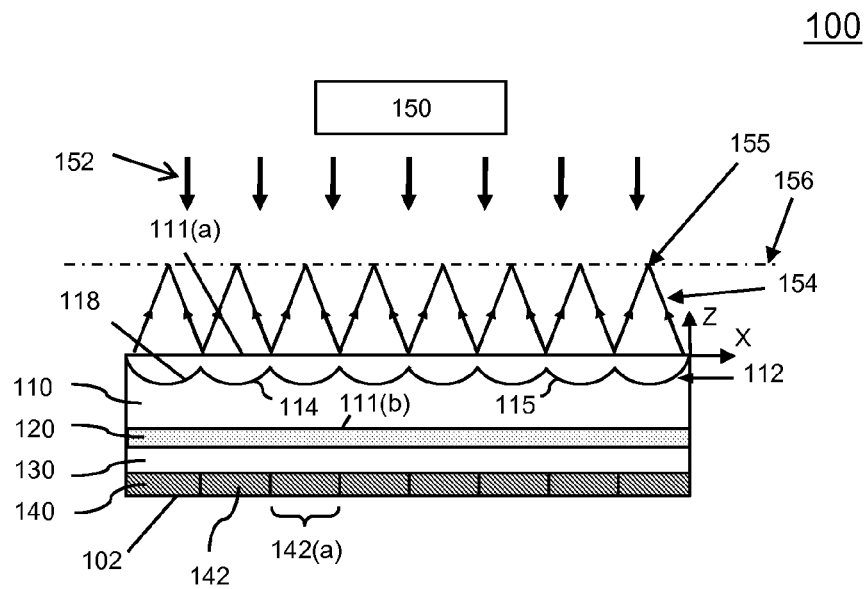
FIG. 2(a) is a schematic drawing of a cross-sectional view of components of the reflective focusing and transmissive projection device comprising a multi-layered body, and an illumination source providing a uniform light field of light of a first type, according to embodiments of the invention.

A curved reflective element 115 refers to any suitable component capable of reflecting light of the first type, transmitting light of a second type, and focusing the reflected light into a focused light projection (e.g., light spot) outside the first surface 111(a) of the surface layer 110. In many cases, the curved reflective element 115 is a reflective coating/film deposited on a curved surface of the contouring element 118. The reflective coating/film can be made of any suitable material of any suitable thickness that reflects light of the first type and transmits light of the second type. The reflective coating/film can have any suitable reflectivity and transmissivity properties. The curved reflective element 115 can be designed with any suitable curvature to provide a suitable focal length to focus the light of the first type to a desired focal plane. In FIG. 2(a), a curved reflective element 115 is designed to focus the light to the first focal plane 156 outside the first surface 111(a) of the surface layer 110. The use of curved reflective surfaces to perform reflective focusing is particularly useful because it has been demonstrated that reflective focusing can actually provide a higher numerical aperture than if a comparable surface is used as a refractive surface for transmissive focusing as shown in F. Merenda, J. Rohner, J. M. Fournier, and R. P. Salathe, "Miniaturized high-NA focusing-mirror multiple optical tweezers," Optics Express 15, 6075-6086 (2007), which is hereby incorporated by reference in its entirety for all purposes. As an example, a lenslet of curvature 0.024 micron$^{-1}$, refractive index of 1.5 and diameter of 30 micron can focus light to a spot of size 1.4 micron (FWHM). If the same lenslet is reflective coated and is used as a reflective surface, it will focus light to a spot of size 0.4 micron (FWHM).

A contouring element 118 refers to any suitable structure for providing a curved surface for supporting the curved reflective element 115. For example, the contouring element 118 may be a lens (e.g., lenslet) or a curved surface molded into a suitable material (e.g., SU-8 film). The contouring element 118 can have any suitable refractive index ratio (e.g., 2, 3, etc.).

In some embodiments, the contouring element 118 also focuses light passing through the contouring element 118. In these embodiments, the contouring element 118 may have a high refractive index ratio (e.g., 3, 4, 5, etc.). In one embodiment, the contouring element 118 helps focus the light of the first type into the light projection (e.g., light spot) outside the first surface 111(a) of the surface layer 110. In another embodiment, the contouring element 118 focuses the light of the second type outside the second surface 111(b) of surface layer 110. For example, the contouring element 118 can be a convex lens (e.g., lenslet) that can focus the light of the second type transmitted through the curved reflective element 115 to outside the second surface 111(b) of the surface layer 110 to the light detector 142.

The set of reflective-focusing components 112 may be in any suitable form. Some examples of suitable forms include a lens array having a reflective coating/film on a surface of each lens, or a curved surface array having a reflective coating/film on the curved surfaces. In a simple embodiment, the set of reflective-focusing components 112 is in the form of a lenslet array. One of the outer surfaces of the lenslets is coated with a reflective coating for reflecting light of a first type (e.g., light of wavelength 1). When light of the first type is shined on the reflective focusing and transmissive projection device 100, the curved reflective element 115 reflects and focuses the light of the first type to form a number of tightly focused light spots 155. The tightly focused spots 155 can be used to scan samples (specimens) by either moving the light spots 155 over the samples or by moving the samples over the light spots 155. The emissions from the samples at the location of the light spots 155 can be transmitted and brought to a focus at the sensor (light detector 142). In some cases, the emissions from each light spot 155 can be uniquely distinguished as long as the emissions (light projections) do not overlap significantly. The emissions can be fluorescence, 2-photon or higher order fluorescence, Raman, second harmonic or higher order, or other emission mechanism that results in emissions at a different wavelength or other different property that the excitation light.

In one exemplary embodiment, the set of reflective-focusing components 112 is in the form of a convex lens array (e.g. lenslet array) having the reflective coating/film deposited or otherwise coupled to one of the curved surfaces of the convex lenses (e.g., lenslets). Each reflective-focusing component 114 is a convex lens having a first curved surface proximal to or comprising the first surface 111(a) of the surface layer 110 and a second curved surface distal the first surface 111(a) and proximal to the second surface 111(b). The reflective coating/film is deposited on the second curved lens surface most distal to the first surface 111(a). In this embodiment, the curved reflective element 115 is the reflective coating (e.g., dichroic filter) deposited on the curved second lens surface of each of the lenses. The curved reflective element 115 reflects light of the first type toward the first surface 111(a) of the surface layer 110 and transmits light of the second type toward the second surface 111(b) of the surface layer 110. The curved reflective element 115 and the contouring element 118 focus the light of the first type into focused light projections outside the first surface 111(a) of the surface layer 110. If the set of reflective-focusing components 112 is located at a suitable distance from the first surface 111(a), the light of the first type will be focused into a first light pattern having light projections (e.g., light spots) to a focal plane 156 outside the first surface 111(a) of the surface layer 110.

In another exemplary embodiment, the set of reflective-focusing components 112 may be in the form of a curved surface array (e.g., surface with an array of curved indentations) formed in a suitable material with a reflective coating/film deposited on or otherwise coating to the curved surfaces to reflect light of a first type and transmit light of a second type. The curved surfaces may be formed in the material using any suitable method. In one case, a lens array (e.g., lenslet array) may be used as a mold for form the shape of the curved indentations in a moldable material and then the reflective coating may be deposited or otherwise coupled to the inside of the molded curved surfaces. In this embodiment, the reflective coating/film on the curved surfaces is the curved reflective element 115, and the molded material is the contouring element 118. If the material has a refractive index variation, the contouring element 118 can also focus the light of a second type transmitted through the curved reflective elements 115.

In many embodiments, the primary enabling concept is the use of a curved surface that is treated to reflect light (e.g., coated with a reflective coating) of a first type (e.g., wavelength 1 or polarization 1) to project an interesting first light field pattern, and 2) to use the same surface in combination with one or more other curved surfaces or other elements with material refractive index variations to transmit and project a second light field pattern onto the light detector 142. In one case, the first light field pattern is a grid of tightly focused light spots of light of the first type and the second light field pattern is a grid of tightly focused light spots of light other than light of the first type.

Any suitable number of reflective-focusing components (e.g., 1, 10, 50, 100, 200, etc.) can be used in any suitable arrangement. Some examples of suitable arrangements include a one-dimensional array, a two-dimensional array, and a multiplicity of one-dimensional and/or two-dimensional arrays. The arrays can have any suitable orientation or combination of orientations. In an optofluidic application, the set of reflective-focusing components 112 may be arranged in one or more one-dimensional arrays extending diagonally at an angle, α with respect to the x-axis. Although the illustrated embodiment shows adjacent reflective-focusing components 114 in the set of reflective-focusing components 112 located next to each other without a separation, other embodiments may have a set of reflective-focusing components 112 with a separation between reflective-focusing components 114. A separation between adjacent reflective-focusing components 114 can allow the system 10 to more easily ascribe the detected light projections to the appropriate light spot. In some cases, the number of reflective-focusing components 114 in the set of reflective-focusing components 112 that is required in the device 100 can be determined from the dimensions of the wide area view covered by the device 100 at any one time.

The set of reflective-focusing components 112 can have any suitable location/orientation in the surface layer 110. The set of reflective-focusing components 112 may be located parallel to and at a suitable distance from the first surface 111(*a*) of the surface layer 110 in order to generate a first light field pattern at a first focal plane 156 outside the first surface 111(*a*) of the surface layer 110. In some embodiments, the location of the reflective-focusing components 114 may be changed to vary the location of the first focal plane 156. The reflective-focusing components 112 may be located at a suitable distance from the second surface 111(*b*) of the surface layer 110 in order to generate the second light field pattern at a second focal plane 160 outside the second surface 111(*b*) of the surface layer 110. The second focal plane 160 may be a surface of the light detector 142. In an optofluidic example, the set of reflective-focusing components 112 may be located in a diagonal orientation across the width of the surface layer 110 to generate light spots in a diagonal pattern.

The curved reflective element 115 can be made of any suitable form of material or combination of materials of any suitable dimensions and having any suitable reflectivity and transmissive properties. For example, the curved reflective element 115 may be a reflective coating or film (e.g. dichroic filter, dielectric filter, etc.) on a curved surface. In one case, the curved reflective element 115 has a reflectivity of greater than 95% for select wavelengths or polarizations.

The body 102 of the reflective focusing and transmissive projection device 100 may optionally include a filter layer 120 located between the surface layer 110 and the intermediate layer 130. The filter layer 130 may include one or more filters. A filter refers to any suitable device (e.g., an optical filter) capable of selectively transmitting light having certain properties (e.g., wavelength, spectral bandwidth, polarization, range of polarizations) while blocking the remainder of the light. Any suitable type of filter may be used. Some examples of suitable types of filters include a polarization filter, dichroic filter, a monochromatic filter, monochromatic filters, etc. In many embodiments, the filter layer 130 includes one or more filters (e.g., an interference filter and an absorption filter) designed to block light of the first type. In one exemplary embodiment, the curved reflective element 115 and the filter(s) in the filter layer 130 are designed to block light of the first type from reaching the light detector 142.

The body 102 also includes a detecting layer 140 located between the surface layer 110 and the intermediate layer 130. The detecting layer 140 includes a light detector 142. A light detector 142 (e.g., photosensor) refers to any suitable device capable of detecting light and generating signals with data about the intensity, wavelength, and/or other information about the light being detected. The signals from the light detector 142 can be in the form of electrical current that results from the photoelectric effect. Some examples of suitable light detectors 140 include a charge coupled device (CCD) or a one-dimensional or two-dimensional array of photodiodes (e.g., avalanche photodiodes (APDs)). The light detector 142 can also be a complementary metal-oxide-semiconductor (CMOS) or photomultiplier tubes (PMTs). Other suitable light detectors 140 are commercially available.

The light detector 142 includes one or more discrete light detecting elements 142(*a*) of any suitable size (e.g., 1-10 microns) and any suitable shape (e.g., circular or square). For example, light detecting elements in CMOSs and CCDs may be 1-10 microns and in APDs and PMTs may be as large as 1-4 mm. The light detecting elements 142(*a*) can be arranged in any suitable form such as a one-dimensional array, a two-dimensional array, or a multiplicity of one-dimensional and/or two-dimensional arrays. The arrays can be in any suitable orientation or combination of orientations. In some cases, the light detecting elements 142(*a*) can be arranged to correspond to the reflective-focusing components 114. For example, the light detecting elements 142(*a*) can have the same form as the set of reflective-focusing component 112 so that one or more light detecting elements 142(*a*) corresponds to a reflective-focusing component 114. In FIG. 1, each light detecting element 142(*a*) corresponds to a reflective-focusing component 114.

System 10 also includes a computer 200 communicatively coupled to the light detector 142. The computer 200 comprises a processor 202 and a computer readable medium 204 (CRM). Alternatively, the computer 200 can be a separate device.

The processor 202 receives signals with light data from the light detector 142 associated with the light received by the light detector 142. The light data may include the intensity of the light, the wavelength(s) of the light, the polarization(s) of the light and/or other information about the light received by the light detector 142. The processor 202 executes code stored on the CRM 204 to perform some of the functions of system 10 such as interpreting the light data from the light detector 142, performing analyses from the light data and/or generating images from the light data.

The CRM 204 (e.g., memory) stores code for performing some functions of system 10. The code is executable by the processor 202. In one embodiment, the CRM 204 comprises: a) code for interpreting the light data received from the light detector 142, b) code for performing analyses based on the light data, c) code for generating one or more images from the light data, d) code for displaying one or more images, and e) any other code for performing the functions of system 10.

Although not shown, system 10 may include other suitable components such as a display, a scanning device, other processors, etc. For example, some embodiments may include a display communicatively coupled to the processor 204. Any suitable display may be used. In some cases, the display may be a part of the reflective focusing and transmissive projection device 100. The display may provide information such as images to a user of the system 10.

In many embodiments, the system 10 also includes a suitable raster or linear scanning device to perform wide field of view imaging or sensing. In one case, system 10 may include a scanning device capable of raster scanning or linearly scanning the light spots of a first type (e.g., wavelength 1) over an area of the specimen equal to or larger than the area covered by each reflective-focusing component 114. Alternatively, the scanning device may raster scan or linearly scan the specimen over the light spots. Any type of scanning can be used, and in any orientation. For example, the scanning device may linearly scan the specimen in a direction at an angle to the x-axis.

In one embodiment, the reflective focusing and transmissive projection device 100 may use electromagnetic radiation or acoustic waves instead of light. In this embodiment, the light field 152 may be a suitable electromagnetic field or an acoustic wave in any medium. Some examples of suitable electromagnetic fields include an X-ray, terahertz field, radio wave, etc. In this embodiment, the reflective-focusing component 114 is a suitable device(s) for reflecting and focusing the electromagnetic radiation or acoustic waves of a first type outside the surface 111(a) of the surface layer 110, and transmitting and/or focusing the electromagnetic radiation or acoustic waves of a second type outside the second surface 111(b) of the surface layer 110. The set of reflective-focusing components 112 collectively reflects and focuses the electromagnetic radiation or acoustic waves of a first type into a first pattern outside the first surface 111(a) of the surface layer 110, and transmitting and/or focusing the electromagnetic radiation or acoustic waves of a second type into a second pattern that is passed through the filter layer 120 to the detector 142 of electromagnetic radiation or acoustic waves. In this embodiment, the reflective coating/film reflects the electromagnetic radiation or acoustic waves of the first type and transmits the electromagnetic radiation or acoustic waves of the second type. The filter layer 120 in this embodiment will include a filter for blocking the electromagnetic radiation or acoustic waves of the first type.

II. Operating Concept

Figure 2B:
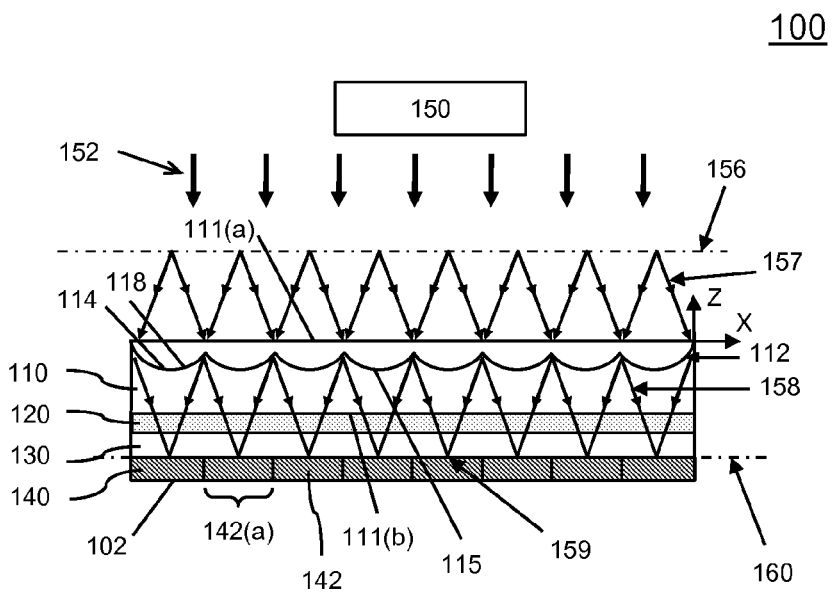
FIG. 2(b) is a schematic drawing of a cross-sectional view of components of the reflective focusing and transmissive projection device comprising a multi-layered body, and an illumination source providing a uniform light field of light of a first type, according to embodiments of the invention.

FIGS. 2(a) and 2(b) illustrate an operating concept of a reflective focusing and transmissive projection device 100, according to embodiments of the invention.

FIG. 2(a) and FIG. 2(b) include a cross-sectional view of components of the reflective focusing and transmissive projection device 100 comprising a multi-layered body 102 and an illumination source 150 providing a uniform light field of light of a first type 152 (e.g., a single wavelength, a single polarization, a spectral bandwidth, etc.). The reflective focusing and transmissive projection device 100 also includes an x-axis and a z-axis that lie in the cross-sectional plane. The z-axis is orthogonal to the second surface 111(b). The x-axis is orthogonal to the z-axis.

In the illustrated example, the body 102 is a multi-layered structure including a surface layer 110 having a first surface 111(a) and an opposing second surface 111(b), an optional filter layer 120, an optional intermediate layer 130 and a detecting layer 140 having a light detector 142 (e.g., a photosensor). Each layer of the body 102 may be made of any suitable material or materials having any suitable thickness, and may include any suitable device(s) (e.g., light detector 142). In one case, the intermediate layer 130 can be made of an opaque or semi-opaque material (e.g., epoxy). Other embodiments may integrate, omit, add, or change the location of one or more layers of the body 102.

In addition to the first surface 111(a) and the second surface 111(b), the surface layer 110 also includes a set of reflective-focusing components 112 including eight (8) reflective-focusing components 114. Although eight (8) reflective-focusing components 114 are included in the illustrated embodiment, any suitable number of reflective-focusing components 114 can be included (e.g., 1, 10, 100, etc.) in the set 112. Also, other embodiments may have a body 102 which omits, integrates, modifies, or adds components.

The set of reflective-focusing components 112 reflects and focuses the light of the first type into a first light field pattern having eight light spots 155 on a first focal plane 156 outside the first surface 111(a) of the surface layer 110, and transmits and focuses light of the second type into a second light field pattern having eight light spots 159 at a second focal plane 160 outside the second surface 111(b) of the surface layer 110. In the illustrated embodiment, the set of reflective-focusing components 112 is arranged in a one-dimensional array. In other embodiments, other suitable arrangements can be used such as a two-dimensional array or a multiplicity of one-dimensional and/or two-dimensional arrays. The arrays can have any suitable orientation or combination of orientations.

FIG. 2(a) shows the trajectory of the light field of the first type in an exemplary operation of the focusing and transmissive projection device 100, according to embodiments of the invention. In the illustration, the illumination source 150 provides the uniform light field of light of the first type 152 (e.g., excitation light) to the reflective focusing and transmissive projection device 100. The set of reflective-focusing components 112 receives the light of the first type, and reflects and focuses the received light of into a first pattern of light spots 155 (e.g., point illuminations) at a first focal plane 156 outside the first surface 111(a) of the surface layer 110. The first trajectory 154 illustrates the path of the light of the first type as reflected and focused by the set of reflective-focusing components 112 into the light spots 155. Although the illustrated example shows light of the second type originating from the sites of the light spots 155, light of the second type may also originate from other areas or sites in other examples.

FIG. 2(b) shows the trajectory of the light field of the second type in the exemplary operation shown in FIG. 2(a), according to embodiments of the invention. In this example, a second trajectory 157 illustrates the path of the light of the second type (e.g., emission light) from the focal spots 155 at the first focal plane 156 and spreading out to the surface 111(a) of the surface layer 110. The set of reflective-focusing components 112 receives the light of the second type, and transmits and focuses the received light of the second type into a second pattern of light spots 159 at a second focal plane 160 outside the second surface 111(b) of the surface layer 110. The third trajectory 158 illustrates the path of the light of the second type as transmitted and focused by the set of reflective-focusing components 112 into the light spots 159 at the second focal plane 160. In many cases, the focal plane 160 is coincident with the surface of the light detector 142. Although light spots are shown in the illustrated embodiments, other less focused or unfocused light projections can be generated in other embodiments.

In FIGS. 2(a) and 2(b), the set of reflective-focusing components 112 reflects light of a first type provided by the illumination source 150 and focuses the reflected light into a first light field pattern at the first focal plane 156 outside the first surface 111(a) of the surface layer 110. The set of reflective-focusing components 112 transmits and focuses light of the second type into a second light field pattern at a second focal plane 160 outside the second surface 111(b) of the surface layer 110. The second focal plane 160 is coincident with a surface of the light detector 142. In other embodiments, the first light field pattern and second light field pattern may be focused to other focal planes.

In some embodiments, reflective focusing and transmissive projection devices 100 are designed for focal plane ranging. These devices 100 are designed to locate the first focal plane 156 at a predefined distance away from the first surface 111(a). This can help locate the first focal plane 156 in close proximity to the specimen or on or in the specimen, which can help improve the quality of detection or resolution of the images generated of the specimen. In these embodiments, the set of reflective-focusing components 112 is positioned at a distance from the first surface 111(a) equal to the focal length of the reflective-focusing components 114 less the predefined distance. By this design, the light spots 155 may be located at the focal plane 156 above the first surface 111(a).

Light of the first type is light having a suitable light property or combination of light properties (e.g., a single wavelength/polarization, range of wavelengths/polarizations, single phase, etc.) selected for reflection. Light of the second type can be light having light properties different from the select light property or properties of the light of the first type. In an exemplary bioluminescence (e.g., fluorescence or phosphorescence) embodiment, light of a first type is an excitation light for activating the fluorophores in a specimen 180 located outside the first surface 111(a) of the surface layer 110. The light of the first type may have a select wavelength/polarization. The light of a second type is the emitted light from the fluorophores. The light of the second type may have a different wavelength/polarization from the wavelength/polarization of the light of the first type. Some examples of suitable excitations lights include a fluorescence, two-photon or higher order fluorescence, Raman, second harmonic or higher order, or other emission mechanism that results in emissions at a different wavelength or other light property than the excitation light.

In the illustrated embodiment, the first light field pattern includes a one-dimensional array of eight light spots 155 focused at the first focal plane 156 and the second light field pattern of a one-dimensional array of eight light spots 159 focused at the second focal plane 160. The light spots 155, 159 may have any suitable dimensions. In one case, the light spots 155, 159 may be tightly confined light spots (e.g., point illuminations). The light properties may be uniform or vary spatially over each light spot. Although the illustrated embodiment shows a light pattern of eight focused light spots in a one-dimensional array, any suitable light pattern (e.g., one-dimensional array, two dimensional array, multiplicity of one and/or two-dimensional arrays having any suitable orientation or orientations) can be used. Also, any suitable number of light spots (e.g., 1, 10, 100, 200, 500, etc.) can be used.

In FIGS. 2(a) and 2(b), each reflective-focusing component 114 includes a contouring element 118 (e.g., lens or material formed with curved surface) and a curved reflective element 115 (e.g., reflective coating) coupled to a curved surface of the contouring element 118. The curved reflective element 115 may be coupled using any suitable method. The curved reflective element 115 can be any suitable component.

For example, the curved reflective element 115 may be a reflective coating/film with suitable reflectivity and transmissivity properties. In FIGS. 2(a) and 2(b), each curved reflective element 115 can reflect and focus the light of the first type to a light spot 155 at the first focal plane 156 outside the first surface 111(a) of the surface layer 110. In FIGS. 2(a) and 2(b), the contouring element 118 can provide the curved surface for application of the curved reflective element 115 and can focus the light of the second type into a light spot 159 at the second focal plane 160 at the surface of the light detector 142 in the detecting layer 140. In some cases, the contouring element 118 may also help focus the light of the first type into the light spot 155. Some examples of suitable contouring elements 118 include a lens, a material molded to have a curved surface, etc.

The set of reflective-focusing components 112 may be in any suitable form. Some examples of suitable forms include a lens array (e.g., lenslet array) having a reflective coating/film on a surface of one or more lenses, or a curved surface array having a reflective coating/film on its curved surfaces.

The body 102 of the reflective focusing and transmissive projection device 100 may optionally include a filter layer 120 located between the set of reflective-focusing components 112 and the light detector 142. The filter layer 120 has one or more filters for blocking light of the first type. Any suitable filter may be used. Some examples of suitable types include a polarization filter, dichroic filter, a monochromatic filter, monochromatic filters, etc. The curved reflective elements 115 and the filter(s) in the filter layer 120 help prevent the light of the first type (e.g., wavelength 1) from reaching the light detector 142 (e.g., photosensor) in the detecting layer 140. In some cases, the filter(s) in the filter layer 120 blocks any light of the first type that may have been transmitted through the set of reflective-focusing components 112 to help ensure that the light collected by the light detector 142 is primarily due to emissions from the specimen.

The body 102 also includes a detecting layer 140 having a light detector 142 (e.g., CCD, APDs, CMOS or PMTs) for detecting light and generating signals with data about the intensity, wavelength, and/or other information about the light being detected. The signals from the light detector 142 can be in the form of electrical current that results from the photoelectric effect.

The light detector 142 includes discrete light detecting elements 142(a). The light detecting elements 142(a) can have any suitable size (e.g., 1-10 microns) and any suitable shape (e.g., circular or square). For example, light detecting elements in CMOSs and CCDs may be 1-10 microns and in APDs and PMTs may be as large as 1-4 mm. In the illustrated example, each light detecting element 142(a) corresponds to a reflective-focusing component 114. In the illustrated example, the light detecting elements 142(a) are arranged in a one-dimensional array to correspond to the one dimensional array of reflective-focusing components 114. That is, each light detecting element 142(a) corresponds to a reflective-focusing component 114. The one-dimensional array may have any suitable orientation. In other embodiments, the light detecting elements 142(a) can be arranged in other forms such as a two-dimensional array or a multiplicity of one-dimensional and two-dimensional arrays. The arrays can be in any suitable orientation or combination of orientations.

An illumination source 150 refers to any suitable light source or sources (e.g., a 100 mW 488 nm Cyan CW laser) providing a light field of light of the first type. In the illustrated example, the illumination source 150 provides a uniform light field of light of the first type 152 to the reflective focusing and transmissive projection device 100. Some suitable sources of light include a LED, laser, white illumination source, etc. In some cases, the illumination source 150 comprises a suitable source of light and a filter for selectively transmitting light having the property or properties of light of the first type 152. For example, the illumination source 150 may include a filter that transmits only the excitation light for activating fluorophores in a specimen 180 being examined by the reflective focusing and transmissive projection device 100. The illumination source 150 may be a component of the reflective focusing and transmissive projection device 100 or may be a separate component. In an exemplary embodiment, the illumination source 150 provides light of a type (e.g., wavelength or polarization) that will cause activation of fluorophores in a specimen being examined or imaged by the reflective focusing and transmissive projection device 100. Although a light (illumination) field is used in many embodiments, other fields can be substituted for the light field in other embodiments. For example, a suitable electromagnetic field can be used. Some examples of suitable electromagnetic fields include an X-ray, terahertz field, radio wave, etc. As another example, the light field can be substituted with an acoustic wave in any medium.

In an exemplary operation, the illumination source 150 provides a uniform light field of light of the first type (e.g., light of wavelength 1) 152 to the surface 111(*a*) of the surface layer 110. The set of reflective-focusing components 112 receives the light and reflects and focuses the light of the first type into a first light field pattern of light spots 155 at the focal plane 156 through a specimen 180 (shown in FIG. 3). The light spots 155 are scanned (e.g., raster scanned or linearly scanned) over areas of the first focal plane 156 corresponding to the reflective-focusing components 114 or over a larger area. By scanning, the device 100 can perform wide field of view imaging or sensing. Either the reflective focusing and transmissive projection device 100 or the specimen stage can be fixed during scanning. In response to receiving the light spots 155, the specimen transmits (e.g., emits) light of a second type. The light of the second type is emitted from the specimen 180 at a greater intensity where the specimen receives the light spots 155. Each reflective-focusing component 114 receives light of the second type associated with corresponding light spots. The set of reflective-focusing components 112 transmits and focuses the received light of the second type into a second light field pattern with light spots 159 on corresponding light detecting elements 142(*a*) of the light detector 142. The filter layer 120 blocks any light of the first type received by the filter layer 120 and transmits light of the second type to help ensure that only light of the second type reaches the light detecting elements 142(*a*). The light detector 142 generates signals with light data associated with the received light. The signals are communicated to a processor 202 in the light detector 142 or in a separate component. The processor 202 uses the light data to compile an image of the specimen 180 or otherwise analyze the specimen 180.

In one embodiment, polarization is used as a selection criterion for the light of the first type and second type instead of wavelength or other light property. In this embodiment, the reflective focusing and transmissive projection device 100 has a set of reflective-focusing components 112 that is designed to reflect and focus light having a polarization 1. Each reflective-focusing component 114 includes a curved reflective element 115 designed to selectively reflect light having a polarization 1 and transmit light of other polarization. Each reflective-focusing component 114 also includes a contouring element 118 configured to focus the reflected light having a polarization 1 into light spots on a specimen located outside the first surface 111(*a*) of the surface layer 110. The specimen 180 emits or otherwise transmits light of other polarization. Light of other polarization is transmitted through the curved reflective element 115 to generate a pattern of light projections on the light detector 142. The light detector 142 receives the light including the light projections and generates signals with light data associated with the light received by the light detector 142. The signals are communicated to a processor 202 in the light detector 142 or in a separate component. The processor 202 uses the light data to compile an image of the specimen 180 or otherwise analyze the specimen 180. In some cases, a scanning device can be used to raster scan or linearly scan the first light field pattern of light projections (e.g., light spots) over the area covered by the corresponding reflective-focusing component 114. In one example, the reflective focusing and transmissive projection device 100 can be fixed and the specimen stage is moved. In another example, the reflective focusing and transmissive projection device 100 can be moved and the specimen stage is fixed. In these cases, the light data generated by the light detector 142 can be used to generate birefringence or scattering images of the specimen.

IV. Optofluidic Application

In many embodiments, a reflective focusing and transmissive projection device 100 efficiently uses an excitation light field by reflecting and focusing the excitation light into tightly focused, high intensity light spots (e.g., point illuminations). In addition, the reflective focusing and transmissive projection device 100 can be designed to focus the light spots to a focal plane above the floor of the fluid channel 170 where specimens may be located. By focusing the high intensity light spots at a focal plane through the specimens, the device 100 can achieve high resolution detection/imaging of the specimens. Further, the reflective focusing and transmissive projection device 100 can efficiently collect emissions by focusing and collecting the emissions at the surface layer 110 in close proximity to specimens.

Incorporating elements of an optofluidic system into the reflective focusing and transmissive projection device 100 provides a highly compact device with highly automatable, high-throughput, and high-resolution (e.g., 0.6 micron or better) bioluminescence emission detection and imaging. Due to its compact size, low-cost and automatable nature, the reflective focusing and transmissive projection device 100 with optofluidic element can be multiplexed into large parallel arrays for cost-effective and high-throughput analyses. Using optofluidic elements also provides advantages such as being able to directly process samples without slide preparation, rapidly image morphological information for specialized analyses (e.g., phenotype characterization), manage large volume analyses in a rapid and cost-effective manner, etc.

Figure 3:
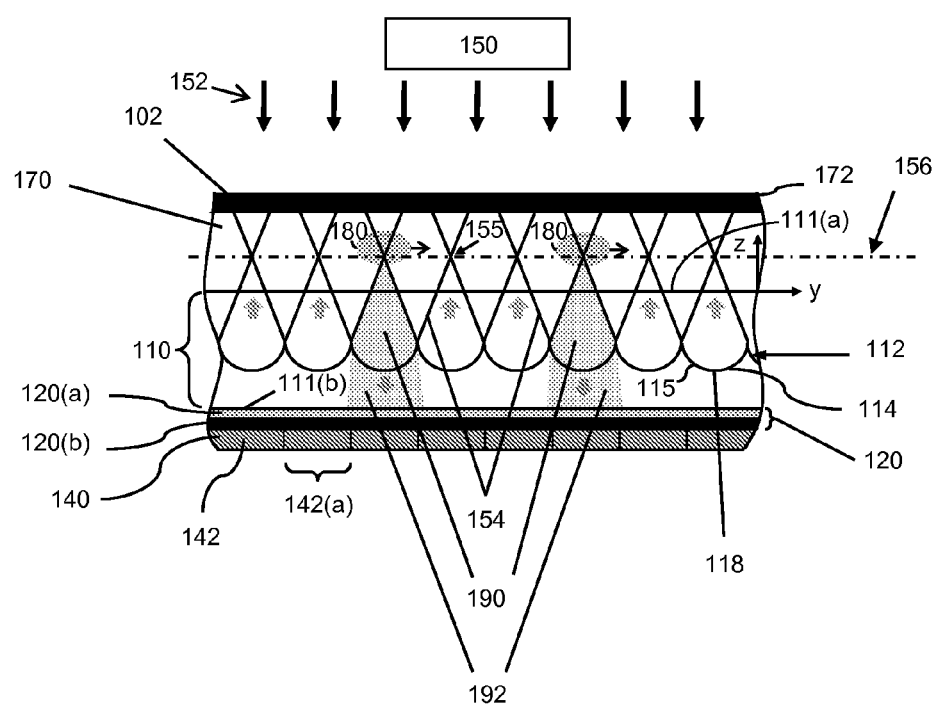
FIG. 3 is a cross-sectional view taken along a diagonal line showing components of a reflective focusing and transmissive projection device having optofluidic elements, according to embodiments of the invention.

FIG. 3 is a cross-sectional view taken along a diagonal line showing components of a reflective focusing and transmissive projection device 100 having optofluidic elements, according to embodiments of the invention. In the illustrated embodiment, the reflective focusing and transmissive projection device 100 comprises a multi-layer body 102 and an illumination source 150 providing a uniform light field of light of a first type 152 (e.g., a single wavelength, a single polarization, a range of wavelengths, etc.). The reflective focusing and transmissive projection device 100 also includes an x-axis and a y-axis. The y-axis lies along a longitudinal axis of the fluid channel 170. The z-axis is orthogonal to the y-axis.

The body 102 includes a surface layer 110 with a first surface 111(*a*) and second surface 111(*a*), a filter layer 120 having an interference filter 120(*a*) and an absorption filter 120(*b*), and a detecting layer 140 having a light detector 142.

In addition, the body 102 defines or includes a fluid channel 170 which has a first channel surface and an opposing second channel surface which coincides with the first surface 111(a) of the surface layer 110. The body 102 also includes a channel surface layer 172. The layers of the body 102 may include any suitable material or combination of materials having any suitable thickness, and may include any suitable devices (e.g., light detector). For example, the channel surface layer 172 may be made of Polydimethylsiloxane (PDMS). Other embodiments may integrate, omit, or add one or more layers or change the location of one or more layers in the body 102.

In the illustrated example, two specimens 180 are shown at a specific time ($t=t_1$) as the specimens 180 move through the fluid channel 170 generally in the y-direction. In this example, the reflective focusing and transmissive projection device 100 is using fluorescence or phosphorescence to image or detect the specimens 180. Although the specimens 180 are shown as cells in the illustrated embodiment, other embodiments may include another suitable object(s). Some examples of suitable objects include biological or inorganic entities. Some examples of biological entities include whole cells, cell components, microorganisms such as bacteria or viruses, cell components such as proteins, etc. Inorganic entities may also be detected or imaged by embodiment of the invention. Although two specimens 180 are shown, any suitable number of specimens may be analyzed by the reflective focusing and transmissive projection device 100.

The fluid channel 170 may have any suitable dimensions. For example, the width and/or height of the fluid channel 170 may each be less than about 10 microns, 5 microns, or 1 micron. In some cases, the fluid channel 170 may be sized based on the size of the specimens 180 being detected by the reflective focusing and transmissive projection device 100. For example, the height of the fluid channel 170 may be at least 10 microns where the specimens 180 being examined are 8 microns to keep the specimens 180 close to the focal plane 156, which may help improve the quality of the detection or resolution of the imaging.

In addition to the first surface 111(a) and the second surface 111(b), the surface layer 110 includes a set of reflective-focusing components 112 located at an angle, θ (90 degrees minus a) with respect to the y-axis. The angle, θ can be any suitable angle. In other embodiments, the surface layer 110 may include additional, alternative or fewer components.

In FIG. 3, the set of reflective-focusing components 112 reflects light of the first type provided by the illumination source 150 and focuses the reflected light into a first light field pattern of light spots 155 at the first focal plane 156 outside the first surface 111(a) of the surface layer 110. After the first focal plane 156, the light of the first type spreads. The specimens 180 pass along the first focal plane 156 and the sites of two light spots 155. In response to the illumination, the specimens 180 emit light of a second type from the sites of the two light spots 155. The set of reflective-focusing components 112 transmits and focuses the light of the second type to light projections at the light detector 142. In the illustrated embodiment, the focused light projections are larger than the light detecting elements 142(a). In other embodiments, the first light field pattern and second light field pattern may be focused to other focal planes and may have other light projections.

In the illustrated example, the light of the first type is an excitation light and the light of the second type is an emission light (e.g., fluorescence, phosphorescence, etc.). The excitation light can have any suitable light property (e.g., a single wavelength, single polarization, etc.) for activating the fluorophores in the specimens. Some examples of suitable excitations lights include a fluorescence, two-photon or higher order fluorescence, Raman, second harmonic or higher order, or other emission mechanism that results in emissions at a different wavelength or other light property than the excitation light. The light of the second type may have a different wavelength/polarization from the select single wavelength/polarization of the light of the first type.

In the illustrated embodiment, the first light field pattern includes a one-dimensional array of light spots 155 at an angle, θ with respect to the y-axis. The angle, θ can be any suitable angle. The light spots 155 are focused at the focal plane 156. The second light field pattern includes a two wider light projections at the light detector 142. The light properties may be uniform or vary spatially over the light spots and wider light projections. Although the illustrated embodiment shows light patterns of one-dimensional arrays, other suitable light patterns (e.g., two dimensional array, multiplicity of one and/or two-dimensional arrays having any suitable orientation or orientations) can be used. Also, any suitable number of light spots or other light projections (e.g., 1, 10, 100, 200, 500, etc.) can be used. Further, the light spots and wider light projections can have any suitable dimension. In addition, the light properties may be uniform or vary spatially over each light spot and/or wider light projections.

In FIG. 3, each reflective-focusing component 114 includes a contouring element 118 (e.g., lens, material formed with curved surface, etc.) and a curved reflective element 115 (e.g., reflective coating) coupled to a curved surface of the contouring element 118. The curved reflective element 115 may be coupled using any suitable method. The curved reflective element 115 can be any suitable material or combination of materials. For example, the curved reflective element 115 may be a reflective coating/film with suitable reflectivity and transmissivity properties. In FIG. 3, each curved surface element 115 can reflect and focus the light of the first type to a light spot 155 at the first focal plane 156 outside the first surface 111(a) of the surface layer 110. In FIG. 3, the contouring element 118 can provide the curved surface for application of the curved reflective element 115 and can focus the light of the second type into a light spot 159 at the second focal plane 160 at the surface of the light detector 142 in the detecting layer 140. In some cases, the contouring element 118 may also help focus the light of the first type into the light spot 155. Some examples of suitable contouring elements 118 include a lens, a material molded to have a curved surface, etc.

The set of reflective-focusing components 112 may be in any suitable form. Some examples of suitable forms include a lens array (e.g., lenslet array) having a reflective coating/film on a surface of each lens, or a curved surface array having a reflective coating/film on the curved surfaces.

In operation, the illumination source 150 provides a uniform light field of light of the first type (e.g., excitation light) to the fluid channel 170. The set of reflective-focusing components 112 receives light of the first type, and reflects and focuses the received light into a first light field pattern of light spots 155 at the first focal plane 156 outside the surface 111(a) of the surface layer 110. The light of the first type spreads to a larger light distribution after passing through the focal plane 156. The trajectory 154 shows the path of the light field of the light of the first type as reflected and focused by each reflective-focusing component 114 to the first focal plane 156 and then spreading to a larger distribution. As fluid flows through the fluid channel 170, the two specimens 180 in the fluid pass through the first light field pattern of light spots 155. The specimens 180 emit light of a second type at the sites of the light spots 155. The two light emissions 190 show the emitted light of the second type spreading from the sites of the light spots 155 to two reflective-focusing components 114. The two reflective-focusing components 114 transmit and slightly focus it. The two light emissions 192 show that the light passing through the reflective-focusing components 115 is slightly more focused. The filter layer 120 blocks any remaining light of the first type and passes the light to the detecting layer 140. Two light detecting elements 142(a) of the light detector 142 receive and detect the second light field pattern having two light projections 192. In this example, the two light projections 192 are larger than the light detecting elements 142(a). The light detector 142 generates time varying light data associated with the light detected as the specimens 180 pass through the light spots 155. The processor 202 receives the time varying light data from the light detector 142 and analyzes the time varying light data and/or generates images of the specimens 180 from the time varying data.

The body 102 of the reflective focusing and transmissive projection device 100 also includes a filter layer having an interference filter 120(a) and an absorption filter 120(b). An interference filter 120(a) refers to a filter that removes light of the first type by interference and transmits other light. An absorption filter 120(b) refers to a filter that removes light of the first type by absorption and transmits other light. Other embodiments may include other filters. The interference filter 120(a) and an absorption filter 120(b) are designed to block light of the first type from reaching the light detector 142.

The body 102 also includes a detecting layer 140 having a light detector 142 (e.g., CCD, APDs, CMOS or PMTs) for detecting light and generating signals with data about the intensity, wavelength, and/or other information about the light being detected. The signals from the light detector 142 can be in the form of electrical current that results from the photoelectric effect.

The light detector 142 includes discrete light detecting elements 142(a). The light detecting elements 142(a) can have any suitable size (e.g., 1-10 microns) and any suitable shape (e.g., circular or square). For example, light detecting elements in CMOSs and CCDs may be 1-10 microns and in APDs and PMTs may be as large as 1-4 mm. In the illustrated example, each light detecting element 142(a) corresponds to a reflective-focusing component 114. In the illustrated example, the light detecting elements 142(a) are arranged in a one-dimensional array to correspond to the one dimensional array of reflective-focusing components 114. That is, each light detecting element 142(a) corresponds to a reflective-focusing component 114. The one-dimensional array may have any suitable orientation. In other embodiments, the light detecting elements 142(a) can be arranged in other forms such as a two-dimensional array or a multiplicity of one-dimensional and two-dimensional arrays. The arrays can be in any suitable orientation or combination of orientations.

An illumination source 150 refers to any suitable light source or sources (e.g., a 100 mW 488 nm Cyan CW laser) providing a light field of light of the first type. In the illustrated example, the illumination source 150 provides a uniform light field of light of the first type 152 to the reflective focusing and transmissive projection device 100. Some suitable sources of light include a LED, laser, white illumination source, etc. In some cases, the illumination source 150 comprises a suitable source of light and a filter for selectively transmitting light having the property or properties of light of the first type 152. For example, the illumination source 150 may include a filter that transmits only the excitation light for activating fluorophores in specimens 180 being examined by the reflective focusing and transmissive projection device 100. The illumination source 150 may be a component of the reflective focusing and transmissive projection device 100 or may be a separate component. In an exemplary embodiment, the illumination source 150 provides light of a type (e.g., wavelength or polarization) that will cause activation of fluorophores in specimens 180 being examined or imaged by the reflective focusing and transmissive projection device 100. Although a light (illumination) field is used in many embodiments, other fields can be substituted for the light field in other embodiments. For example, a suitable electromagnetic field can be used. Some examples of suitable electromagnetic fields include an X-ray, terahertz field, radio wave, etc. As another example, the light field can be substituted with an acoustic wave in any medium.

In an exemplary bioluminescence operation, a reagent may be mixed with a sample comprising the specimens 180. The reagent may be a suitable chemical that can tag portions (e.g., molecules of a cell nucleus) of the specimens 180 with fluorophores. The resulting fluid is introduced into the device 100.

The fluid within which the specimens 180 are suspended, flows through the fluid channel 170. Any suitable mode or modes of controlling the flow or fluid and/or movement of the specimens 180 can be employed. Any suitable devices such as micropumps, DC electrokinetic devices, dielectrophoresis electrodes, and/or hydrodynamic focusing channels can be used to control the flow of fluid and/or the movement of the specimens 180 through the fluid channel 170.

The illumination source 150 provides a uniform light field 152 of light of a first type (e.g., excitation light) to the fluid channel 170. The set of reflective-focusing components 112 generates a first light field pattern of light spots 155 (e.g., point illumination sources) at the first focal plane 156. As the fluid flows with the specimens through the fluid channel 170, the specimen 170 passes through the light spots 155 at $t=t_1$. The light spots excite the fluorophores in portions of the specimen 180. In response, the fluorophores emit light of the second type from the vicinity of the sites of the light spots 155. The set of reflective-focusing components 112 transmits and focuses the emitted light onto the light detector 142.

As the specimens 180 passes through the fluid channel 170, the light detecting elements 142(a) take data (e.g., intensity, wavelength, phase, etc.) of light over time. The time varying data can be used to image or otherwise analyze the specimens 180. In the illustrated embodiment, each reflective-focusing component 114 and light spot 155 uniquely maps to a single light detecting element 142(a). Each discrete light detecting element 142(a) in the light detector 142 generates time varying data that can be used to generate a line scan associated with locations along the x-axis. The time varying data is communicated in the form of a signal. The time varying data from the light detecting element 142(a) is dependent on the fluorophores in the specimens 180. For example, the time varying data that corresponds to a low intensity of light of the second type at a position for a determined period of time may provide data regarding the length of the specimen at the position along the x-axis in the fluid channel 170. The time varying data can be processed using a processor 202 to construct image(s) of the specimens 180 using the line scans and, optionally, other data. In some cases, certain data can be used to determine the rotation and velocity of the specimens 180 as they flow through the channel 170. The time varying data for each light detecting element 142(a) can then be processed to form images or otherwise analyze the specimens 180 while accounting for the rotation and/or the velocity of the specimens 180.

In some embodiments, the specimens 180 are illuminated with both the first uniform light field 152 and with the light spots 155 which generates a general signal at the light detector 142. The uniform light field generates a time-stable background signal that can be subtracted out of the general signal by the processor 202. In many cases, the light spots 155 will be at least three orders of magnitude greater in intensity when compared to the uniform light field 152.

In one embodiment, a system 10 may include multiple reflective focusing and transmissive projection device 100 having optofluidic elements, located in a series to examine specimens 180 at a different planes through the specimens 180. For example, the system 10 may include a series of devices 100 along a fluid channel 170. Each device 100 may be designed to examine (e.g. image or analyze) the specimens 180 at a different focal planes 156. In each case, the device 100 may have the set of reflective-focusing components 112 located at a different distances from the first surface 111(a) of the surface layer 110 so that each device 100 is focused at a different focal plane 156. The time varying data from the light detectors 142 in each device 100 can be compiled by processor(s) 202 to generate analyses or images at multiple focal planes (e.g., three-dimensional analyses).

In one embodiment, the set of reflective-focusing components 112 is in the form of a one-dimensional lenslet array having a reflective coating/film (e.g., dichoric filter). The lenslet array is oriented at an angle with respect to the y-axis of the fluid channel 170. The light of the first type (e.g., excitation light) is reflected by the curved surfaces of the lenslet array and comes into sharp focus within the fluid channel 170. The array of light spots can then be used to effectively excite fluorophores in the specimens 180 passing through the fluid channel 170. The light of the second type (e.g., fluorescent or phosphorescent emissions) can then be collected by the lenslet array and channeled onto the light detector 142. The reflective coating/film and the filter(s) in the filter layer 120 may screen the light of the first type from reaching the light detector 142. By monitoring the time-varying signal associated with each light spot while specimens 180 passes across the array of light spots, the processor 202 can generate OFM images of the specimens 180.

In one embodiment, a system 10 includes multiple reflective focusing and transmissive projection devices 100 having optofluidic elements, located in a series or in parallel to examine the emissions from specimens based on different excitation light (e.g., light having different wavelengths or polarizations). The system 10 can perform multi-spectral fluorescence or phosphorescence imaging or other analyses. Conventional multi-spectral fluorescence imaging systems typically required swapping of chromatic filters between each acquisition step. As the number of slots in a filter carousel is limited, the acquisition of more than 5 wavelength bands typically requires a carousel swap. In the system 10 with multi-spectral fluorescence or phosphorescence imaging, the acquisition of multi-spectral images can be implemented automatically by connecting several multiple reflective focusing and transmissive projection devices 100 having optofluidic elements in series. The multiple reflective focusing and transmissive projection devices 100 will have different filters (e.g., bandpass filters) in the filter layer 120 for transmitting light of different spectral bandwidths so that the light detecting elements 142(a) will only detect light of a specific spectral bandwidth (e.g., 420-490 nm, 550-610 nm, and 620-680 nm). The sample with specimens 180 can be exposed to multiple fluorescent or phosphorescent dyes associated with the different spectral bandwidths. In this way, a single passage of specimens 180 through the fluid channel 170 will allow the collection of a complete set of fluorescence images.

In many embodiments, the specimens 180 are illuminated by both the uniform light field 152 and the light spots 155 which generates a general signal at the light detector 142. The uniform light field typically generates a time-stable background signal at the light detector 142. Since the specimens 180 are moving through the light spots 155 in a fluid channel 170, the specimens 180 are being illuminated by different light spots at different times and the emissions from the specimens 180 can vary with time. The light spots typically can generate a time-varying signal at the light detector 142. The processor 202 can determine the time-variable signal associated with light spots 155 by subtracting the time stable background signal from the general signal. In many cases, the light spots 155 may be at least three orders of magnitude greater in intensity when compared to the uniform light field 152. In these cases, the processor 202 may be able to determine the time-variable signal associated with light spots 155 by subtracting the lower intensity background signal from the general signal.

V. Fabrication Techniques

In many embodiments, a reflective focusing and transmissive projection device 100 having a multi-layered body 102 can be fabricated using standard semiconductor and micro/nanofabrication procedures.

In one embodiment, a reflective focusing and transmissive projection device 100 has a set of reflective-focusing components 112 in the form of a lens (e.g., lenslet) array with a reflective coating, which can be fabricated using standard semiconductor and micro/nanofabrication procedures. For example, the detecting layer 140 comprising a light detector 142 (e.g., CMOSsensor) can be coated with the one or more filters of the filter layer 120 capable of blocking the light of the first type (excitation light) with good efficiency. The lens array can be coated with the reflective coating/film. The lens (e.g., lenslet) array with reflective coating can be placed directly on top of the filter layer 120 to form the surface layer 110. In one case, a lenslet array having a lens curvature 0.024 micron$^{-1}$ and a lens diameter of 30 micron can be used. In an OFM application shown in FIG. 3, the channel surface layer 172 may be used to form the fluid channel 170 or a formed fluid channel 170 may be placed on top of the surface layer 110.

In another embodiment, a reflective focusing and transmissive projection device 100 with a set of reflective-focusing components 112 in the form of curved surface array with a reflective coating, which can be fabricated using standard semiconductor and micro/nanofabrication procedures. For example, the detecting layer 140 comprising a light detector 142 (e.g., CMOS sensor) can be coated with the one or more filters of the filter layer 120 capable of blocking the light of the first type (excitation light) with good efficiency. A layer of a moldable material (e.g., epoxy) can be coated on the filter layer 120. Next, a lens array or other curved surface form is pressed into the moldable material to create an indentation casting of concave indentations. After the moldable material hardens the reflective coating/film can be coated on the concave indentations. In an OFM application shown in FIG. 3, the channel surface layer 172 may be used to form the fluid channel 170 or a formed fluid channel 170 may be placed on top of the surface layer 110.

VI. Computer Devices

Figure 4:
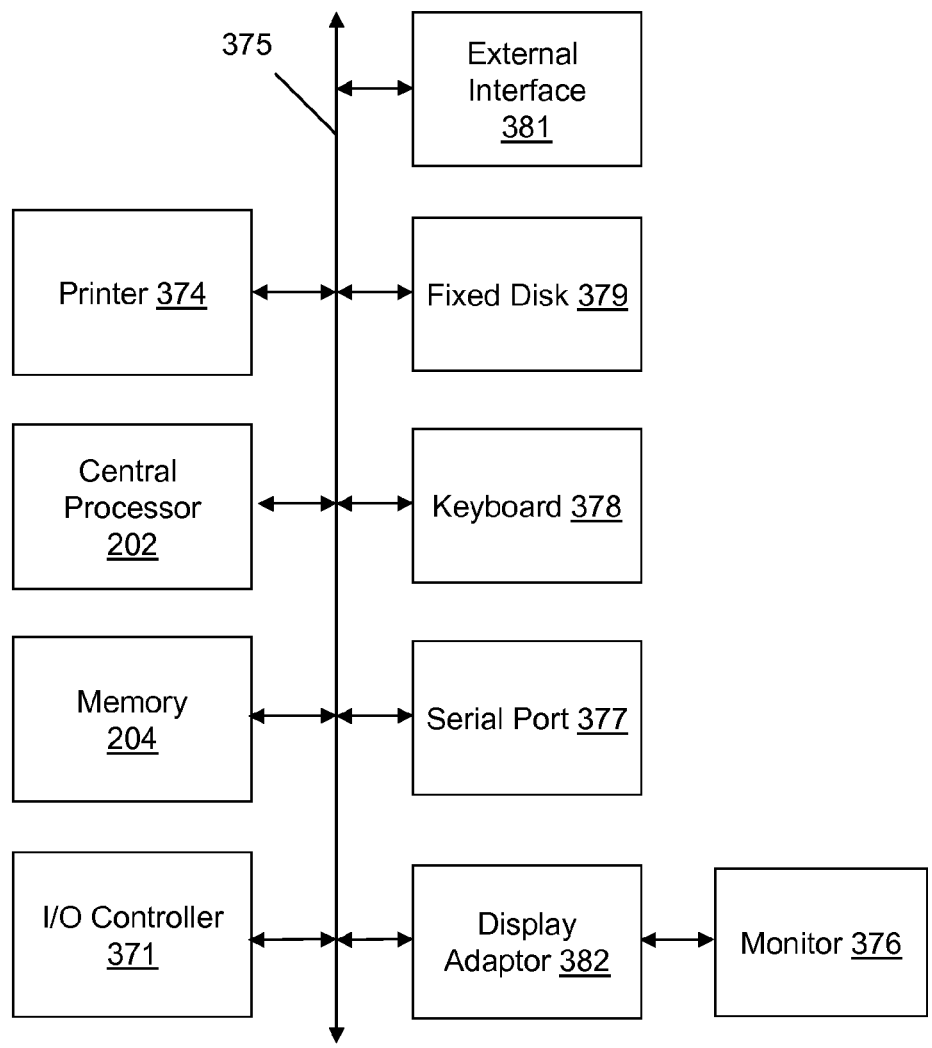
FIG. 4 shows a block diagram of subsystems that may be present in computer devices that are used in a reflective focusing and transmissive projection system, according to embodiments of the invention.

FIG. 4 shows a block diagram of subsystems that may be present in computer devices that are used in reflective focusing and transmissive projection system 10, according to embodiments of the invention. For example, the computer 200 in communication with the reflective focusing and transmissive projection device 100 may have any suitable combination of components in FIG. 4.

The various components previously described in the Figures may operate using one or more computer devices to facilitate the functions described herein. Any of the elements in the Figures may use any suitable number of subsystems to facilitate the functions described herein. Examples of such subsystems or components are shown in a FIG. 4. The subsystems shown in FIG. 4 are interconnected via a system bus 375. Additional subsystems such as a printer 374, keyboard 378, fixed disk 379 (or other memory comprising computer readable media), monitor 376, which is coupled to display adapter 382, and others are shown. Peripherals and input/output (I/O) devices, which couple to I/O controller 371, can be connected to the computer system by any number of means known in the art, such as serial port 357. For example, serial port 377 or external interface 381 can be used to connect the computer apparatus to a wide area network such as the Internet, a mouse input device, or a scanner. The interconnection via system bus allows the central processor 202 to communicate with each subsystem and to control the execution of instructions from system memory 204 or the fixed disk 379, as well as the exchange of information between subsystems. The system memory 204 and/or the fixed disk 379 may embody a computer readable medium. Any of these elements may be present in the previously described features. A computer readable medium according to an embodiment of the invention may comprise code for performing any of the functions described above.

In some embodiments, an output device (e.g., the printer 374) of the reflective focusing and transmissive projection system 10 can output various forms of data. For example, the reflective focusing and transmissive projection system 10 can output a fluorescence image of a specimen or other results of analysis.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

All patents, patent applications, publications, and descriptions mentioned above are hereby incorporated by reference in their entirety for all purposes. None is admitted to be prior art.

What is claimed is:

1. A reflective focusing and transmissive projection device comprising:
    a body having a surface layer with first and second surfaces, and a detecting layer outside the second surface of the surface layer;
    a set of reflective-focusing components in the surface layer, each reflective-focusing component having a contouring element and a curved reflective element conformed to the contouring element, the curved reflective element configured to reflect light of a first type and transmit light of a second type, the curved reflective element further configured to focus the light of the first type to outside the first surface of the surface layer; and
    a light detector in the detecting layer, and configured to receive light and generate light data associated with the received light.

2. The reflective focusing and transmissive projection device of claim 1, wherein the contouring element is configured to focus the light of the second type on the light detector.

3. The reflective focusing and transmissive projection device of claim 2, wherein the light of the first type is focused to a first focal plane and the light of the second type is focused to a second focal plane parallel to the first focal plane.

4. The reflective focusing and transmissive projection device of claim 1, wherein the reflective focusing component comprises a reflective coating on a curved surface of the contouring element.

5. The reflective focusing and transmissive projection device of claim 1, wherein the contouring element is configured to focus the light of the first type.

6. The reflective focusing and transmissive projection device of claim 1, wherein the reflected light of the first type is focused into a first pattern of light projections.

7. The reflective focusing and transmissive projection device of claim 6, wherein the light projections are light spots.

8. The reflective focusing and transmissive projection device of claim 1, wherein the light of the second type is focused into a second pattern of light projections outside the second surface of the surface layer.

9. The reflective focusing and transmissive projection device of claim 1, wherein light of the second type is light emitted from a specimen in response to receiving the focused light of the first type.

10. The reflective focusing and transmissive projection device of claim 1, wherein the set of reflective-focusing components is a lenslet array having a reflective coating.

11. The reflective focusing and transmissive projection device of claim 1, wherein the set of reflective-focusing components is a curved surface array having a reflective coating.

12. The reflective focusing and transmissive projection device of claim 1, further comprising a filter layer located between the surface layer and the light detector, the filter layer configured to block light of the first type.

13. The reflective focusing and transmissive projection device of claim 1, wherein the light of the first type is light having a first wavelength, and wherein the light of the second type is light having a second wavelength different from the first wavelength.

14. The reflective focusing and transmissive projection device of claim 1, wherein the light of the first type is light having a first polarization, and wherein the light of the second type is light having a second polarization different from the first polarization.

15. A reflective focusing and transmissive projection system comprising:

a reflective focusing and transmissive projection device including a body having a surface layer with first and second surfaces, and a detecting layer outside the second surface of the surface layer, a set of reflective-focusing components in the surface layer, each reflective-focusing component having a contouring element and a curved reflective element conformed to the contouring element, the curved reflective element configured to reflect light of a first type and transmit light of a second type, the curved reflective element also configured to focus the light of the first type to outside the first surface of the surface layer, and a light detector in the detecting layer, and configured to receive light and generate light data associated with the received light; and a processor in electronic communication with the light detector, the processor configured to receive the light data from the light detector and analyze the light data.

16. The reflective focusing and transmissive projection system of claim 15, wherein the contouring element is configured to focus the light of the second type on the light detector.

17. The reflective focusing and transmissive projection system of claim 15, wherein the reflected light of the first type is focused into a first pattern of light spots.

18. The reflective focusing and transmissive projection system of claim 15, wherein the light of the second type is focused into a second pattern of light projections outside the second surface of the surface layer.

19. A reflective focusing and transmissive projection device comprising:

a body defining a fluid channel, and comprising a surface layer having a first surface proximal to the fluid channel and a second surface, the body further comprising a detecting layer outside the second surface of the surface layer;

a one-dimensional array of reflective-focusing components located in the surface layer, each reflective-focusing component having a contouring element and a curved reflective element conformed to the contouring element, the curved reflective element configured to reflect light of a first type and transmit light of a second type from the fluid channel, the curved reflective element also configured to focus the light of the first type to the fluid channel, wherein the one-dimensional array of reflective-focusing components extends substantially across from a first lateral side to a second lateral side of the fluid channel; and a light detector in the detecting layer, and configured to receive light and generate time varying data associated with the received light as a specimen passes through the fluid channel.

20. The reflective focusing and transmissive projection device of claim 19, wherein the contouring element is configured to focus the light of the second type on the light detector.

* * * * *